(12) United States Patent
Deevi et al.

(10) Patent No.: US 8,006,703 B2
(45) Date of Patent: Aug. 30, 2011

(54) IN SITU SYNTHESIS OF COMPOSITE NANOSCALE PARTICLES

(75) Inventors: Sarojini Deevi, Midlothian, VA (US); Rangaraj S. Sundar, Midlothian, VA (US); Yezdi B. Pithawalla, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 1116 days.

(21) Appl. No.: 10/972,204

(22) Filed: Oct. 25, 2004

(65) Prior Publication Data

US 2005/0166934 A1 Aug. 4, 2005
US 2009/0071489 A9 Mar. 19, 2009

Related U.S. Application Data

(60) Provisional application No. 60/518,680, filed on Nov. 12, 2003, provisional application No. 60/514,525, filed on Oct. 27, 2003.

(51) Int. Cl.
*A24B 15/18* (2006.01)
(52) U.S. Cl. ......... 131/334; 502/300; 502/344; 502/345
(58) Field of Classification Search .................. None
See application file for complete search history.

(56) References Cited

U.S. PATENT DOCUMENTS

| | | |
|---|---|---|
| 3,720,214 A | 3/1973 | Norman et al. |
| 3,807,416 A | 4/1974 | Hedge et al. |
| 3,931,824 A | 1/1976 | Miano et al. |
| 4,108,151 A | 8/1978 | Martin et al. |

(Continued)

FOREIGN PATENT DOCUMENTS

| | | |
|---|---|---|
| WO | WO 87/06104 A1 | 10/1987 |
| WO | WO 00/40104 A1 | 7/2000 |
| WO | WO 02/24005 A2 | 3/2002 |
| WO | WO 02/24005 A3 | 3/2002 |

OTHER PUBLICATIONS

G. Avgouropoulos, T. Ioannides, Ch. Papadopoulou, J. Batista, S. Hocevar, H. K. Matralis, A comparative study of Pt/[gamma]-Al2O3, Au/[alpha]-Fe2O3 and CuO-CeO2 catalysts for the selective oxidation of carbon monoxide in excess hydrogen, Catalysis Today, vol. 75, Issues 1-4, Jul. 3, 2002, pp. 157-167, ISSN 0920-5861, DOI: 10.1016/S0920-5861(02)0.*

(Continued)

*Primary Examiner* — Richard Crispino
*Assistant Examiner* — Michael J Felton
(74) *Attorney, Agent, or Firm* — Buchanan Ingersoll & Rooney PC

(57) ABSTRACT

A method of making composite nanoscale particles comprising subjecting a starting material to laser energy so as to form a vapor and condensing the vapor so as to form the composite nanoscale particles, wherein said composite nanoscale particles comprise a first metal and/or a first metal oxide incorporated in nanoscale particles of an oxide of a second metal, the first metal being different than the second metal. The starting material can comprise first and second metals or compounds of the first and second metals. The composite nanoscale particles can be formed in a reaction chamber wherein a temperature gradient is provided. The atmosphere in the chamber can be an inert atmosphere comprising argon or a reactive atmosphere comprising oxygen. The composite nanoscale particles are useful for low-temperature and near-ambient temperature catalysis. The composite nanoscale particles can be incorporated in the tobacco cut filler, cigarette paper and/or cigarette filter material of a cigarette to catalyze the oxidation of carbon monoxide to carbon dioxide.

30 Claims, 16 Drawing Sheets

U.S. PATENT DOCUMENTS

| | | | |
|---|---|---|---|
| 4,109,663 | A | 8/1978 | Maeda et al. |
| 4,119,104 | A | 10/1978 | Roth |
| 4,182,348 | A | 1/1980 | Seehofer et al. |
| 4,195,645 | A | 4/1980 | Bradley, Jr. et al. |
| 4,197,861 | A | 4/1980 | Keith |
| 4,450,847 | A | 5/1984 | Owens |
| 4,453,553 | A | 6/1984 | Cohn |
| 4,489,739 | A | 12/1984 | Mattina, Jr. et al. |
| 4,744,374 | A | 5/1988 | Deffeves et al. |
| 5,101,839 | A | 4/1992 | Jakob et al. |
| 5,105,836 | A | 4/1992 | Gentry et al. |
| 5,129,408 | A | 7/1992 | Jakob et al. |
| 5,211,684 | A | 5/1993 | Shannon et al. |
| 5,284,166 | A | 2/1994 | Cartwright et al. |
| 5,322,075 | A | 6/1994 | Deevi et al. |
| 5,386,838 | A | 2/1995 | Quincy, III et al. |
| 5,427,993 | A | 6/1995 | Perry et al. |
| 5,580,655 | A | 12/1996 | El-Shall et al. |
| 5,591,368 | A | 1/1997 | Fleischhauer et al. |
| 5,598,868 | A | 2/1997 | Jakob et al. |
| 5,671,758 | A | 9/1997 | Rongved |
| 5,728,462 | A | 3/1998 | Arino et al. |
| 5,891,548 | A | 4/1999 | Graiver et al. |
| 5,934,289 | A | 8/1999 | Watkins et al. |
| 6,053,176 | A | 4/2000 | Adams et al. |
| 6,095,152 | A | 8/2000 | Beven et al. |
| 6,136,156 | A * | 10/2000 | El-Shall et al. .......... 204/157.41 |
| 6,138,684 | A | 10/2000 | Yamazaki et al. |
| 6,286,516 | B1 | 9/2001 | Bowen et al. |
| 6,368,406 | B1 * | 4/2002 | Deevi et al. .................. 117/108 |
| 6,371,127 | B1 | 4/2002 | Snaidr et al. |
| 6,406,745 | B1 | 6/2002 | Talton |
| 6,419,998 | B1 | 7/2002 | McGrath |
| 6,444,336 | B1 | 9/2002 | Jia et al. |
| 6,769,437 | B2 | 8/2004 | Hajaligol et al. |
| 6,782,892 | B2 | 8/2004 | Li et al. |
| 6,857,431 | B2 | 2/2005 | Deevi et al. |
| 7,004,993 | B2 | 2/2006 | Pithawalla et al. |
| 7,152,609 | B2 | 12/2006 | Li et al. |
| 7,165,553 | B2 | 1/2007 | Luan et al. |
| 7,168,431 | B2 | 1/2007 | Li et al. |
| 7,228,862 | B2 | 6/2007 | Hajaligol et al. |
| 7,243,658 | B2 | 7/2007 | Deevi et al. |
| 2002/0002979 | A1 | 1/2002 | Bowen et al. |
| 2002/0062834 | A1 | 5/2002 | Snaidr et al. |
| 2003/0037792 | A1 | 2/2003 | Snaidr et al. |

OTHER PUBLICATIONS

Carla de Leitenburg, Alessandro Trovarelli, Francesca Zamar, Stefano Maschio, Giuliano Dolcetti and Jordi Llorca, A novel and simple route to catalysts with a high oxygen storage capacity: the direct room-temperature synthesis of $CeO_2$—$ZrO_2$ solid solutions, J. Chem. Soc., Chem. Commun., 1995, pp. 2181-2182, DOI: 1039/C39950002181.*

Philip G. Harrison, Ian K. Ball,, Wan Azelee,,, Wayne Daniell,, and, Daniella Goldfarb, Nature and Surface Redox Properties of Copper(II)-Promoted Cerium(IV) Oxide CO-Oxidation Catalysts, Chemistry of Materials 2000 12 (12), 3715-3725.*

L. Filotti, A. Bensalem, F. Bozon-Verduraz, G. A. Shafeev, V. V. Voronov, A comparative study of partial reduction of ceria via laser ablation in air and soft chemical route, Applied Surface Science, vols. 109-110, Feb. 1, 1997, pp. 249-252, ISSN 0169-4332, DOI: 10.1016/S0169-4332(96)00665-4.*

Commonly Owned Applications in Connection With U.S. Appl. No. 10/972,204 U.S. Appl. No. 10/460,617, Preparation of Intermetallics by Metallo-Organic Decomposition, filed Jun. 13, 2003.

U.S. Appl. No. 10/460,631, Catalyst to Reduce Carbon Monoxide in the Mainstream Smoke of a Cigarette, filed Jun. 13, 2003.

U.S. Appl. No. 10/460,302, Oxidant/Catalyst Nanoparticles to Reduce Tobacco Smoke Constituents Such as Carbon Monoxide, filed Jun. 13, 2003.

U.S. Appl. No. 10/972,205, Formation and Deposition of Sputtered Nanoscale Particles in Cigarette Manufacture, filed Oct. 25, 2004.

U.S. Appl. No. 10/972,209, In Situ Synthesis of Composite Nanoscale Particles, filed Oct. 25, 2004.

U.S. Appl. No. 10/972,201, Tobacco Cut Filler Including Metal Oxide Supported Particles, filed Oct. 25, 2004.

U.S. Appl. No. 10/972,202, Preparation of Mixed Metal Oxide Catalysts From Nanoscale Particles, filed Oct. 25, 2004.

U.S. Appl. No. 10/972,203, Cigarettes and Cigarette Components Containing Nanostructured Fibril Materials, filed Oct. 25, 2004.

U.S. Appl. No. 10/866,181, Cigarette Wrapper With Catalytic Filler and Methods of Making Same, filed Jun. 14, 2004.

U.S. Appl. No. 10/870,449, Shredded Paper With Catalytic Filler in Tobacco Cut Filler and Methods of Making Same, filed Jun. 14, 2004.

U.S. Appl. No. 10/972,206, Reduction of Carbon Monoxide in Smoking Articles Using Transition Metal Oxide Clusters, filed Oct. 25, 2004.

U.S. Appl. No. 10/868,015, Silver and Silver Oxide Catalysts for the Oxidation of Carbon Monoxide in Cigarette Smoke, filed Jun. 16, 2004.

U.S. Appl. No. 10/972,208, Reduction of Carbon Monoxide and Nitric Oxide in Smoking Articles Using Nanoscale Particles and/or Clusters of Nitrided Transition Metal Oxides, filed Oct. 25, 2004.

U.S. Appl. No. 11/252,773, Palladium-Containing Nanoscale Catalysts, filed Oct. 19, 2005.

U.S. Appl. No. 10/972,207, Use of Oxyhydroxide Compounds in Cigarette Paper for Reducing Carbon, filed Oct. 25, 2004.

U.S. Appl. No. 10/972,295, Cigarette Wrapper With Nanoparticle Spinel Ferrite Catalyst and Methods of Making Same, filed Oct. 25, 2004.

U.S. Appl. No. 11/653,856, Cigarette Components Having Encapsulated Catalyst Particles and Methods of Making and Use Thereof, filed Jan. 17, 2007.

U.S. Appl. No. 11/636,589, Supported Catalysts, filed Dec. 11, 2006.

U.S. Appl. No. 11/729,951, In Situ Formation of Catalytic Cigarette Paper, filed Mar. 30, 2007.

U.S. Appl. No. 11/698,192, Catalysts to Reduce Carbon Monoxide Such as in the Mainstream Smoke of a Cigarette, filed Jan. 26, 2007.

U.S. Appl. No. 10/950,663, Nanocomposite Copper-Ceria Catalysts for Low Temperature or Near-Ambient Temperature Catalysis and Methods for Making Such Catalysts, filed Sep. 28, 2004.

U.S. Appl. No. 11/252,849, Gold-Ceria Catalyst for Oxidation of Carbon Monoxide, filed Oct. 19, 2005.

U.S. Appl. No. 11/452,995, Gold-Ceria Catalyst for Oxidation of Carbon Monoxide, filed Jun. 15, 2006.

U.S. Appl. No. 11/370,843, Method for Forming Activated Copper Oxide Catalysts, filed Mar. 9, 2006.

U.S. Appl. No. 11/371,021, Catalysts for Low Temperature Oxidation of Carbon Monoxide, filed Mar. 9, 2006.

U.S. Appl. No. 11/641,003, Corrugated Catalytic Cigarette Paper and Cigarettes Comprising the Same, filed Dec. 19, 2006.

U.S. Appl. No. 11/077,554, Methods for Forming Transition Metal Oxide Clusters and Smoking Articles Comprising Transition Metal Oxide Clusters, filed Mar. 11, 2005.

U.S. Appl. No. 10/560,396, Cigarette Wrapper With Printed Catalyst, filed Nov. 2, 2006.

U.S. Appl. No. 10/972,209, filed Oct. 25, 2004, Deevi et al.

Katz, "Condensation of Supersaturated Vapor. I. The Homogeneous Nucleation of the n-Alkanes", The Journal of Chemical Physics, May 1, 1970, pp. 4733-4748, vol. 52, No. 9.

* cited by examiner

IN SITU SYNTHESIS OF COMPOSITE NANOSCALE PARTICLES

This application claims priority under 35 U.S.C. §119 to U.S. Provisional Application No. 60/518,680 entitled IN SITU SYNTHESIS OF COMPOSITE NANOSCALE PARTICLES, filed Nov. 12, 2003 the entire content of which is hereby incorporated by reference, and U.S. Provisional Application No. 60/514,525, entitled IN SITU SYNTHESIS OF COMPOSITE NANOSCALE PARTICLES, filed Oct. 27, 2003.

BACKGROUND

Smoking articles, such as cigarettes or cigars, produce both mainstream smoke during a puff and sidestream smoke during static burning. One constituent of both mainstream smoke and sidestream smoke is carbon monoxide (CO). The reduction of carbon monoxide in smoke is desirable.

SUMMARY

A method of making composite nanoscale particles comprises subjecting a starting material to laser energy so as to form a vapor and condensing the vapor so as to form the composite nanoscale particles, wherein said composite nanoscale particles comprise a first metal and/or a first metal oxide incorporated in nanoscale particles of an oxide of a second metal, the first metal being different than the second metal.

A method of making a cigarette comprising the composite nanoscale particles comprises the steps of: (i) subjecting a starting material to laser energy so as to form a vapor and condensing the vapor so as to form the composite nanoscale particles, wherein said composite nanoscale particles comprise a first metal and/or a first metal oxide incorporated in nanoscale particles of an oxide of a second metal, the first metal being different than the second metal; (ii) incorporating the composite nanoscale particles in and/or on at least one of tobacco cut filler, cigarette paper and cigarette filter material; (iii) providing the tobacco cut filler to a cigarette making machine to form a tobacco column; and (iv) placing the cigarette paper around the tobacco column to form a tobacco rod of a cigarette.

According to a preferred embodiment, the starting material can comprise the first and second metals or compounds of the first and second metals in the form of one or more targets. For example, the starting material can comprise a single target that comprises the first metal and the oxide of the second metal, or the starting material can comprise a first target of the first metal and/or the first metal oxide and a second target of the second metal and/or oxide of the second metal.

Preferably, at least some of the first metal and/or the first metal oxide is incorporated in the lattice structure of the oxide of the second metal. The composite nanoscale particles made by the method can comprise from about 2 to 70% by weight of the first metal and/or the first metal oxide. Exemplary first and second metals include Mg, Al, Si, Ti, V, Cr, Mn, Fe, Co, Ni, Cu, Zn, Ge, Y, Zr, Nb, Mo, Ru, Rh, Pd, Ag, Sn, Ce, Pr, La, Hf, Ta, W, Re, Os, Ir, Pt and Au. According to a preferred embodiment, the first metal is copper and the oxide of the second metal is cerium oxide.

The composite nanoscale particles preferably have an average particle size of less than about 100 nm and comprise an oxide of a second metal that is at least partially a non-stoichiometric oxide of the second metal.

The laser vaporization, which can be carried out in a reaction chamber, can be provided by a beam of a laser which strikes the starting material such that the beam is moved relative to the starting material. The reaction chamber preferably has an upper portion and a lower portion wherein the temperature maintained in the upper portion is less than the temperature maintained in the lower portion such that the condensing occurs in the upper portion. Thus, a temperature gradient is preferably maintained in the reaction chamber, and the vaporized starting material condenses into composite nanoscale particles that deposit in a relatively cool portion of the chamber. The vaporized starting material can condense in the gas phase such as via interactions with one or more gases present in the reaction chamber.

An inert carrier gas or a reactive gas mixture comprising an inert carrier gas and a reactive gas can be added to the reaction chamber. A preferred inert carrier gas is helium or argon gas. Reactant gas mixtures comprise oxygen, water vapor, air or mixtures thereof, though a preferred reactive gas mixture comprises an inert carrier gas and oxygen. The gas pressure in the reaction chamber can be greater than about $10^{-3}$ Torr (e.g., from about 760 to $10^4$ Torr). A preferred gas pressure in the reactor is atmospheric pressure.

The composite nanoscale particles can be heated at a temperature of at least about 200° C. such as in an atmosphere comprising oxygen (e.g., an atmosphere comprising argon and about 20% oxygen) which can oxidize the first metal. The heating is preferably done after formation of the composite nanoscale particles (e.g., before incorporating the composite nanoscale particles into a component of a cigarette).

According to an embodiment, a cigarette component such as tobacco cut filler, cigarette paper and cigarette filter material can comprise the composite nanoscale particles. When incorporated into a cigarette, the composite nanoscale particles are capable of acting as a catalyst for the conversion of carbon monoxide to carbon dioxide. Cigarettes incorporating the composite nanoscale particles preferably comprise an amount of the composite nanoscale particles effective to reduce the ratio in mainstream smoke of carbon monoxide to carbon dioxide by at least 10%. In an embodiment, the composite nanoscale particles are incorporated in an amount effective to convert at least about 5% (e.g., at least about 10, 20, 30, 40, 50, 60, 70, 80 or 90%) of the carbon monoxide to carbon dioxide at a temperature of less than about 175° C. The composite nanoscale particles can be incorporated along the length of the tobacco rod such as by spraying, dusting or immersion.

DETAILED DESCRIPTION OF PREFERRED EMBODIMENTS

Figure 1:
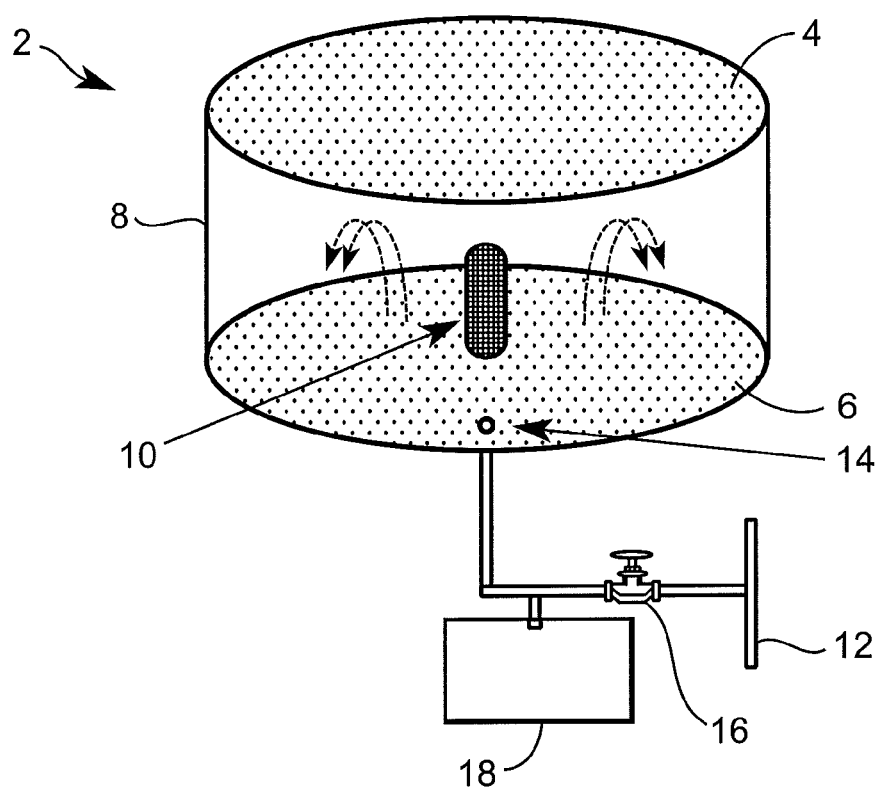
FIG. 1 shows an experimental setup for the Laser Vaporization Controlled Condensation (LVCC) technique that includes a diffusion cloud chamber.

Composite nanoscale particles can be incorporated into a component of a cigarette such as tobacco cut filler, cigarette paper and/or cigarette filter material. The composite nanoscale particles can act as a catalyst to oxidize carbon monoxide to carbon monoxide. In particular, the composite nanoscale particles are useful for low-temperature or near-ambient oxidation of carbon monoxide. By incorporating the composite nanoscale particles into a component of a cigarette, the amount of carbon monoxide in mainstream smoke can be reduced.

Composite nanoscale particles can be provided by subjecting a starting material (e.g., target) to laser energy so as to form a vapor and condensing the vapor so as to form the composite nanoscale particles, wherein said composite nanoscale particles comprise a first metal and/or a first metal oxide incorporated in nanoscale particles of an oxide of a second metal, the first metal being different than the second metal.

By incorporated in is meant that the first metal and/or a first metal oxide can be located in the crystal lattice of the oxide of a second metal (i.e., an atom of the first metal can be substituted at the atomic site of the second metal) or the first metal and/or a first metal oxide can comprise a second phase that is incorporated into the matrix of the oxide of a second metal (i.e., a homogeneous or inhomogeneous composite).

According to a preferred embodiment, the first metal and/or the first metal oxide and the oxide of the second metal are formed simultaneously and co-deposited to form the composite nanoscale particles. The composite nanoscale particles can be deposited directly on a component of a cigarette or, more preferably, the composite nanoscale particles can be formed, collected, and subsequently incorporated in a component of a cigarette.

In an ablative process, a region of the target absorbs incident energy from the energy (e.g., laser) source. The incident energy can comprise, for example, pulsed laser energy. This absorption of energy and subsequent heating of the target causes the target material to ablate from the surface of the target into a plume of atomic and ionic species (i.e., vapor). The atomic and ionic species can condense into nanoscale particles by vapor phase collisions with each other and with an inert or reactive gas.

The amount of energy required will vary depending on process variables such as the temperature of the starting material, the pressure of the atmosphere surrounding the starting material, and material properties such as the thermal and optical properties of the starting material. With laser ablation, the starting material is progressively removed from the target by physical erosion. The target is formed of (or coated with) a consumable material to be removed, i.e., target material.

The starting material may be any suitable precursor material with a preferred form being solid or powder materials composed of pure materials or a mixture of materials. Such materials are preferably solids at room temperature and/or not susceptible to chemical degradation such as oxidation in air. For example, the starting material can comprise a pressed-powder target.

The laser energy preferably vaporizes the starting material directly, without the material undergoing significant liquid phase transformation. The types of lasers that can be used to generate the laser energy can include ion lasers, UV excimer lasers, Nd-YAG and He—Ne lasers. The laser beam can be scanned across the surface of the target material in order to improve the uniformity of target wear by erosion and to improve the reproducibility of the atomic and nanometer-scale particles.

The method combines the advantages of pulsed laser vaporization with controlled condensation in a diffusion cloud chamber under well-defined conditions of pressure and temperature. The method can employ pulsed laser vaporization of at least one target into a selected gas mixture in a modified diffusion cloud chamber. Typically, the chamber includes two horizontal metal plates separated by an insulating side wall. The target is placed in the chamber, e.g., on the lower plate, and the chamber is filled with a gas such as an inert gas or a mixture of an inert gas and a reactive gas. For example, the inert gas can comprise helium, argon or mixtures thereof, and the reactive gas can comprise oxygen. Preferably a temperature gradient is maintained between the top and bottom plates, which can create a steady convection current that can be enhanced by using a heavy gas such as argon and/or by using above atmospheric pressure conditions in the chamber (e.g., from about 760 Torr to $10^4$ Torr). Details of suitable diffusion cloud chambers can be found in The Journal of Chemical Physics, Vol. 52, No. 9, May 1, 1970, pp. 4733-4748, the disclosure of which is hereby incorporated by reference.

A schematic illustration of an LVCC chamber 2 suitable for production of composite nanoscale particles is shown in FIG. 1. Two circular horizontal stainless steel plates denoted as the top cold plate 4 and the bottom hot plate 6 are separated by a glass sidewall 8 with about a 6 inch outer diameter. A bulk target 10 is set on the bottom plate 6, and may be contained in a holder. The reaction chamber 2 is connected to a gas supply 12 through a gas inlet hole 14 situated on the bottom plate. The gas supply is isolated from the chamber by a control valve 16. The pressure in the chamber and within the gas lines is monitored through an optional Barocel pressure sensor and readout 18, which are coupled into the gas line. The chamber and the gas line can be evacuated to a base pressure of approximately $10^{-3}$ Torr. During each experimental run the chamber is filled with either a high purity (e.g., 99.99%) carrier gas such as He or Ar or a reactive mixture, which contains a known composition of a reactive gas (e.g., $O_2$) seeded within a carrier gas. For example, the reactive mixtures used may be oxygen in helium or oxygen in argon. Prior to each deposition run the chamber is filled and evacuated several times with the carrier gas to ensure removal of any trace residual impurities from the chamber.

The energy source can be positioned external to the chamber such that the energy beam enters the chamber through a wall of the chamber or, alternatively, the energy source can be positioned inside the chamber. The ejected atoms interact with the gas mixture in the chamber. Both diffusion and convection can aid in removal of the small particles away from the nucleation zone (once condensed out of the vapor phase) before they can grow into larger particles.

The vapor can be created in the chamber by focusing the output of a laser such as the second harmonic of a Q-switched Nd-YAG laser (wavelength 532 nm; 10 ns pulse duration)

onto the bulk target. Typically the laser is run at 30 Hz and delivers a power of 15-100 mJ/pulse onto the target.

Laser vaporization produces a high-density vapor within a very short time, typically $10^{-8}$ sec, in a directional jet that allows directed deposition. The collisions between the particles ejected from the target undergo Brownian motion during the gas-to-particle conversion and result in the formation of composite nanoscale particles. Laser vaporization is possible from several different targets simultaneously or a single compound target, yielding composite nanoscale particles preferably comprising a first metal and/or a first metal oxide incorporated in nanoscale particles of an oxide of a second metal. Preferably, the nanoscale particles of the oxide of the second metal have an average particle size of less than about 100 nm, more preferably less than about 50 nm, most preferably less than about 10 nm.

As mentioned above, a steady convection current can be created within the chamber. The steady convection current can be achieved in two ways; either the top plate 4 is cooled such as by circulating liquid nitrogen and the bottom plate 6 is kept at a higher temperature (e.g., room temperature) or the bottom plate 6 is heated such as by circulating heating fluid or by an electrical heater and the top plate 4 is kept at a lower temperature (e.g., room temperature). For example, the top plate can be cooled to less than 150 K by circulating liquid nitrogen in fluid passages in the top plate. In either case, the top plate is kept at a temperature significantly lower than the bottom plate, which makes the top plate the condensation or deposition plate. Preferably the temperature gradient between the top plate and the bottom plate is at least about 20° C., more preferably at least 50° C. Nichrome heating wires wrapped around the glass sidewall heat the glass sidewall can reduce deposition on the glass and also promote a uniform temperature gradient between the two plates. The temperatures of the plates are monitored using thermocouples attached to each plate and connected in parallel to a Kurt Lesker Model KJL-902056 temperature readout.

The temperature of the chamber atmosphere decreases as the top plate is approached resulting in maximum super-saturation developing in the upper half of the chamber. The higher the super-saturation, the smaller will be the size of the nucleus required for condensation. Changing the temperature gradient may enhance the super-saturation in the chamber. Convection plays a role in diffusion of the particles out of the nucleation zone before they grow larger in size. Convection within the chamber may be enhanced by increasing the temperature gradient or by using a heavier carrier gas (argon as compared to helium). In producing composite nanoscale particles, the vapor produced can be cooled or condensed by subjecting the vapor phase to collisions with an inert gas, reactive gas and/or the cold plate.

During laser ablation, if the density of the ablated particles is sufficiently low, and their relative velocities sufficiently high, particles (e.g., atoms, clusters and charged particles) from the target material can travel through the gas until they impact the surface of the cold plate or a component of a cigarette that is positioned on the cold plate where they can coalesce into nanoscale particles. On the other hand if the density of the ablated particles is sufficiently high, and their relative velocities sufficiently small, particles from the target can aggregate in the gas phase into nanoscale particles, which can then deposit on the cold plate or deposit on a component of a cigarette that is positioned on the cold plate.

Without wishing to be bound by theory, at an ablation pressure lower than about $10^{-3}$ Torr the mean free path of ablated species is sufficiently long that ablated species arrive at the cold plate without undergoing many gas phase collisions. Thus at lower reactor pressures, ablated material can deposit on a surface of the cold plate and diffuse and coalesce with each other to form nanoscale particles after alighting on the cold plate. At higher pressures, such as pressures above about $10^{-3}$ Torr, the collision frequency in the gas phase of ablated species is significantly higher and nucleation and growth of the ablated species to form nanoscale particles can occur in the gas phase before alighting on the surface of the cold plate. Thus at higher pressures ablated material can form composite nanoscale particles in the gas phase, which can deposit as discrete nanoscale particles.

After a typical run the chamber is brought to room temperature and the sample is collected and stored under atmospheric conditions. By controlling the temperature gradient, the chamber pressure and the laser power (which can be used to determine the number density of the atoms released in the vapor phase, (e.g., on the order of $10^{14}$ atoms per pulse), the process of condensation and consequently the size and composition of the composite nanoscale particles can be controlled.

The operating pressure in the chamber is preferably greater than about $10^{-3}$ Torr, and more preferably between about 760 Torr and $10^4$ Torr. The temperature gradient can be adjusted by altering the temperatures of the top and/or bottom plates of the chamber. The temperature of the upper plate is preferably between about −150° C. and 30° C. The temperature of the lower plate is preferably between about 20° C. and 150° C. In order to reduce condensation on the sidewalls of the chamber, the sidewalls can be heated, e.g., resistance heater wires surrounding the outer periphery of the side wall can be used to heat the side wall. It should be appreciated that although the LVCC apparatus described above has a top plate that is cooled relative to a bottom plate, this geometry can be reversed (e.g., the top plate can be heated relative to the bottom plate).

The method is preferably performed with an inert environment of helium and/or argon at pressures higher than atmospheric pressure in the chamber, which reduces the possibility of atmospheric contamination during the synthesis. However, as indicated above, the reaction may also be carried out at pressures lower than atmospheric pressure.

An added advantage of the method is the capability of preparing selected metal and metal oxide nanoscale particles by precisely introducing known concentrations of a reactive (e.g., oxidizing) gas such as oxygen into the reaction chamber. The introduction of reactive gases into the chamber during the deposition process allows material ablated from the target to combine with such gases to obtain compound nanoscale particles. Thus, in reactive ablation the chamber includes a small proportion of a reactive gas, such as air, oxygen, water vapor, etc., which reacts with the atoms of the target material to form nanoscale particles comprising a metal or metal oxide. The first and second metals can comprise Mg, Al, Si, Ti, V, Cr, Mn, Fe, Co, Ni, Cu, Zn, Ge, Y, Zr, Nb, Mo, Ru, Rh, Pd, Ag, Sn, Ce, Pr, La, Hf, Ta, W, Re, Os, Ir, Pt and Au. For example, composite copper-cerium oxide nanoscale particles may be formed by ablating a copper-cerium target in argon and oxygen. Composite copper-cerium oxide nanoscale particles comprise first nanoscale particles that comprise copper (e.g., Cu, CuO and/or $Cu_2O$) that are incorporated in nanoscale particles of the oxide of cerium (e.g., $CeO_{2-x}$).

In addition to reactive ablation, composite nanoscale particles can be deposited via ablation from a target comprising a corresponding compound (e.g., oxide). For example, composite copper-cerium oxide nanoscale particles may be formed by ablating a copper-cerium oxide target in argon.

The microstructure of the composite nanoscale particles can be controlled using ablation. Particle density, phase distribution and the extent and morphology of crystalline (versus amorphous) phases can be controlled by varying, for example, the pressure, laser energy and temperature of the cold plate. The composition of the composite nanoscale particles, including the ratio of the first metal and/or the first metal oxide to the oxide of the second metal, can be controlled by controlling the composition of the target.

Advantageously, ablation allows for dry, solvent-free, simultaneous formation and deposition of composite nanoscale particles under sterile conditions. According to an embodiment, the composite nanoscale particles can be used to catalyze the conversion of carbon monoxide to carbon dioxide in the mainstream smoke of a cigarette.

An embodiment relates to a method of making a cigarette comprising composite nanoscale particles, comprising the steps of (i) subjecting a starting material to laser energy so as to form a vapor and condensing the vapor so as to form the composite nanoscale particles, wherein said composite nanoscale particles comprise a first metal and/or a first metal oxide incorporated in nanoscale particles of an oxide of a second metal, the first metal being different than the second metal; (ii) incorporating the composite nanoscale particles in and/or on at least one of tobacco cut filler, cigarette paper and cigarette filter material; (iii) providing the tobacco cut filler to a cigarette making machine to form a tobacco column; and (iv) placing the cigarette paper around the tobacco column to form a tobacco rod of a cigarette.

The composite nanoscale particles, which are capable of acting as a catalyst for the conversion of carbon monoxide to carbon dioxide, can reduce the amount of carbon monoxide in mainstream smoke during smoking by incorporating the composite nanoscale particles into the tobacco cut filler, cigarette paper and/or cigarette filter material of a cigarette.

Preferably, the composite nanoscale particles are incorporated in tobacco cut filler, cigarette paper and/or cigarette filter material in an amount effective to reduce the ratio in mainstream smoke of carbon monoxide to carbon dioxide by at least 10% (e.g., by at least 15%, 20%, 25%, 30%, 35%, 40% or 45%).

"Smoking" of a cigarette means the heating or combustion of the cigarette to form smoke, which can be drawn through the cigarette. Generally, smoking of a cigarette involves lighting one end of the cigarette and, while the tobacco contained therein undergoes a combustion reaction, drawing the cigarette smoke through the mouth end of the cigarette. The cigarette may also be smoked by other means. For example, the cigarette may be smoked by heating the cigarette and/or heating using electrical heater means, as described in commonly-assigned U.S. Pat. Nos. 6,053,176; 5,934,289; 5,591,368 or 5,322,075.

The term "mainstream" smoke refers to the mixture of gases passing down the tobacco rod and issuing through the filter end, i.e. the amount of smoke issuing or drawn from the mouth end of a cigarette during smoking of the cigarette.

In addition to the constituents in the tobacco, the temperature and the oxygen concentration are factors affecting the formation and reaction of carbon monoxide and carbon dioxide. The total amount of carbon monoxide formed during smoking comes from a combination of three main sources: thermal decomposition (about 30%), combustion (about 36%) and reduction of carbon dioxide with carbonized tobacco (at least 23%). Formation of carbon monoxide from thermal decomposition, which is largely controlled by chemical kinetics, starts at a temperature of about 180° C. and finishes at about 1050° C. Formation of carbon monoxide and carbon dioxide during combustion is controlled largely by the diffusion of oxygen to the surface ($k_a$) and via a surface reaction ($k_b$). At 250° C., $k_a$ and $k_b$ are about the same. At 400° C., the reaction becomes diffusion controlled. Finally, the reduction of carbon dioxide with carbonized tobacco or charcoal occurs at temperatures around 390° C. and above.

During smoking there are three distinct regions in a cigarette: the combustion zone, the pyrolysis/distillation zone, and the condensation/filtration zone. While not wishing to be bound by theory, it is believed that the composite nanoscale particles can target the various reactions that occur in different regions of the cigarette during smoking.

First, the combustion zone is the burning zone of the cigarette produced during smoking of the cigarette, usually at the lighted end of the cigarette. The temperature in the combustion zone ranges from about 700° C. to about 950° C., and the heating rate can be as high as 500° C./second. Because oxygen is being consumed in the combustion of tobacco to produce carbon monoxide, carbon dioxide, water vapor and various organic compounds, the concentration of oxygen is low in the combustion zone. The low oxygen concentrations coupled with the high temperature leads to the reduction of carbon dioxide to carbon monoxide by the carbonized tobacco. In this region, the composite nanoscale particles can convert carbon monoxide to carbon dioxide via both catalysis and oxidation mechanism. The combustion zone is highly exothermic and the heat generated is carried to the pyrolysis/distillation zone.

The pyrolysis zone is the region behind the combustion zone, where the temperatures range from about 200° C. to about 600° C. The pyrolysis zone is where most of the carbon monoxide is produced. The major reaction is the pyrolysis (i.e., the thermal degradation) of the tobacco that produces carbon monoxide, carbon dioxide, smoke components and charcoal using the heat generated in the combustion zone. There is some oxygen present in this region, and thus the composite nanoscale particles may act as a catalyst for the oxidation of carbon monoxide to carbon dioxide. The catalytic reaction begins at about 50° C. and reaches maximum activity around 150 to 300° C.

In the condensation/filtration zone the temperature ranges from ambient to about 150° C. The major process in this zone is the condensation/filtration of the smoke components. Some amount of carbon monoxide and carbon dioxide diffuse out of the cigarette and some oxygen diffuses into the cigarette. The partial pressure of oxygen in the condensation/filtration zone does not generally recover to the atmospheric level.

According to a preferred method, the composite nanoscale particles are incorporated in tobacco cut filler, cigarette paper and/or cigarette filter material used to form a cigarette. Nanoscale particles are a novel class of materials whose distinguishing feature is that their average diameter, particle or other structural domain size is below 100 nanometers. The composite nanoscale particles can have an average particle size less than about 100 nm, preferably less than about 50 nm, more preferably less than about 10 nm, and most preferably less than about 7 nm. At this small scale, a variety of confinement effects can significantly change the properties of the material that, in turn, can lead to commercially useful characteristics. For example, nanoscale particles have very high surface area to volume ratios, which makes them attractive for catalytic applications.

Cerium oxide is a preferred constituent in the composite nanoscale particles because as either $CeO_{2-x}$ (x>0) or doped $CeO_{2-x}$ (x>0) cerium oxide can act both as a support in synergy with the first metal and/or the first metal oxide and an active metal oxide oxidation catalyst. An equilibrium between $Ce^{3+}$ and $Ce^{4+}$ can result in an exceptionally high oxygen storage and release capacity that enables catalytic combustion of CO by providing oxygen directly to catalytically active sites. Also, $CeO_{2-x}$ is less susceptible to deactivation from water vapor and more resistant to sintering than other oxides such as $Al_2O_3$.

The composite nanoscale particles, as described above, may be provided continuously along the length of a tobacco rod or at discrete locations along the length of a tobacco rod. Furthermore, the composite nanoscale particles may be homogeneously or inhomogeneously distributed along the length of a tobacco rod. The composite nanoscale particles may be added to cut filler tobacco stock supplied to a cigarette making machine or incorporated directly in a tobacco column prior to wrapping cigarette paper around the cigarette column. The composite nanoscale particles may be deposited directly on and/or incorporated in cigarette paper before or after the cigarette paper is incorporated into a cigarette.

Composite nanoscale particles will preferably be distributed throughout the tobacco rod, cigarette filter material and/or along the cigarette paper portions of a cigarette. By providing the composite nanoscale particles throughout one or more components of a cigarette it is possible to reduce the amount of carbon monoxide drawn through the cigarette, and particularly at both the combustion region and in the pyrolysis zone.

If the nanoscale composite catalyst is located in the filter element of a cigarette, the filter may be a mono filter, a dual filter, a triple filter, a cavity filter, a recessed filter or a free-flow filter. The nanoscale composite catalyst can be incorporated into one or more filter parts selected from the group consisting of: shaped paper insert, a plug, a space between plugs, cigarette filter paper, plug wrap, a cellulose acetate sleeve, a polypropylene sleeve, and a free-flow sleeve.

The amount of the nanoscale particles can be selected such that the amount of carbon monoxide in mainstream smoke is reduced during smoking of a cigarette. Preferably, the amount of the nanoscale particles will be a catalytically effective amount, e.g., an amount sufficient to catalyze at least 10% of the carbon monoxide in mainstream smoke, more preferably at least 25%.

One embodiment provides a method for forming composite nanoscale particles and then depositing the composite nanoscale particles on and/or incorporating the composite nanoscale particles in tobacco cut filler in forming a cigarette.

Any suitable tobacco mixture may be used for the cut filler. Examples of suitable types of tobacco materials include flue-cured, Burley, Maryland or Oriental tobaccos, the rare or specialty tobaccos, and blends thereof. The tobacco material can be provided in the form of tobacco lamina, processed tobacco materials such as volume expanded or puffed tobacco, processed tobacco stems such as cut-rolled or cut-puffed stems, reconstituted tobacco materials, or blends thereof. The tobacco can also include tobacco substitutes.

In cigarette manufacture, the tobacco is normally employed in the form of cut filler, i.e., in the form of shreds or strands cut into widths ranging from about 1/10 inch to about 1/20 inch or even 1/40 inch. The lengths of the strands range from between about 0.25 inches to about 3.0 inches. The cigarettes may further comprise one or more flavorants or other additives (e.g., burn additives, combustion modifying agents, coloring agents, binders, etc.) known in the art.

A further embodiment provides a method of making a cigarette comprising composite nanoscale particles, comprising the steps of (i) subjecting a starting material to laser energy so as to form a vapor and condensing the vapor so as to form the composite nanoscale particles, wherein said composite nanoscale particles comprise a first metal and/or a first metal oxide incorporated in nanoscale particles of an oxide of a second metal, the first metal being different than the second metal; (ii) incorporating the composite nanoscale particles in at least one of tobacco cut filler, cigarette paper and cigarette filter material; (iii) providing the tobacco cut filler to a cigarette making machine to form a tobacco column; and (iv) placing the cigarette paper around the tobacco column to form a tobacco rod of a cigarette.

Techniques for cigarette manufacture are known in the art. Any conventional or modified cigarette making technique may be used to incorporate the composite nanoscale particles. The resulting cigarettes can be manufactured to any known specifications using standard or modified cigarette making techniques and equipment. The cut filler composition is optionally combined with other cigarette additives, and provided to a cigarette making machine to produce a tobacco column, which is then wrapped in cigarette paper, and optionally tipped with filters.

Cigarettes may range from about 50 mm to about 120 mm in length. The circumference is from about 15 mm to about 30 mm in circumference, and preferably around 25 mm. The tobacco packing density is typically between the range of about 100 mg/cm³ to about 300 mg/cm³, and preferably 150 mg/cm³ to about 275 mg/cm³.

Composite nanoscale particles produced by LVCC were analyzed by x-ray diffraction and transmission electron microscopy (TEM). X-Ray diffraction (XRD) patterns were obtained using a Philips X'Pert Materials Research Diffractometer which uses Cu $K_{\alpha 1}$ radiation. The size and shape of the individual particles were investigated using a Jeol JEM-200FXE transmission electron microscope operated at 200 kV, which was also equipped with a Tracor Northern 5500 EDX analysis system for compositional analysis. High resolution TEM (HRTEM) images were obtained using the Jeol-4000EX operated at 400 kV.

Figure 2A:
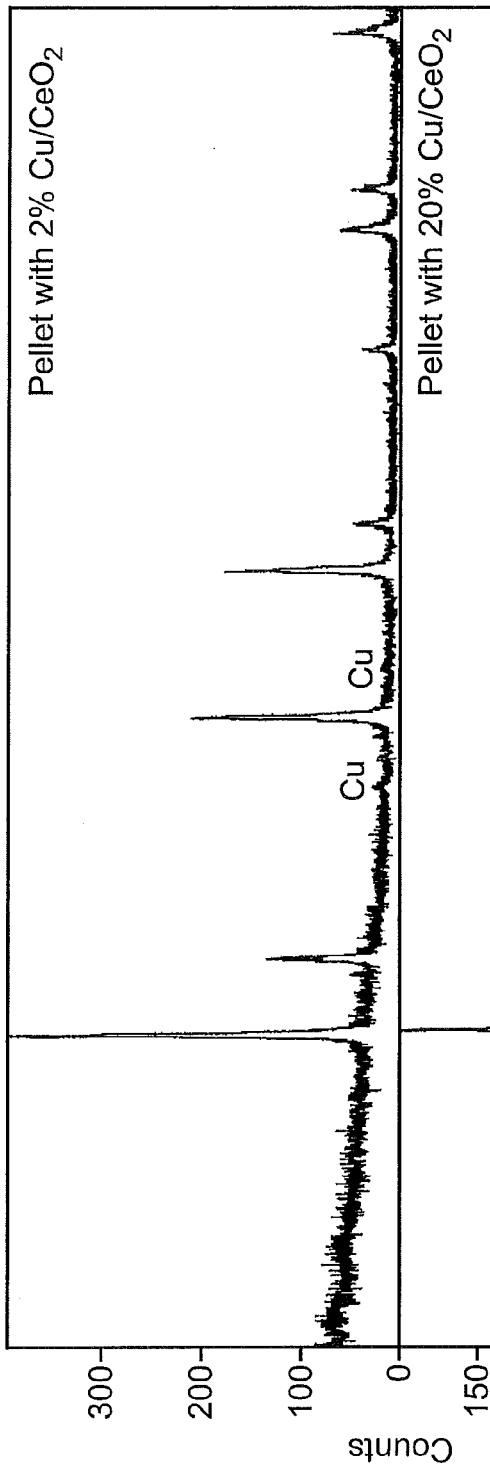
FIG. 2 shows X-ray diffraction patterns for starting material (curves a-b) and nanoscale particles (curves c-d) prepared according to preferred embodiments.
Figure 2B:
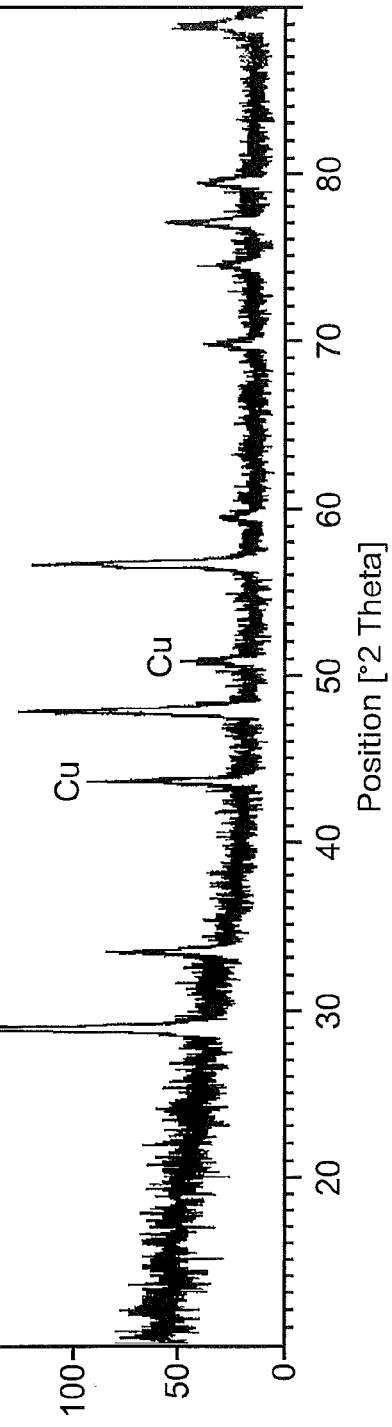
Figure 2C:
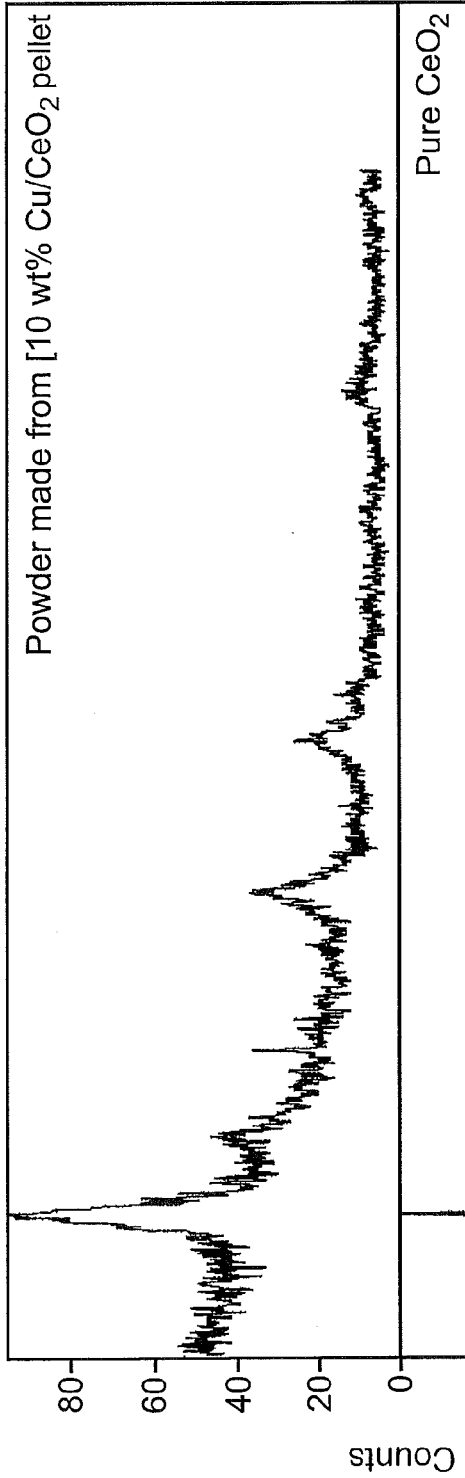

In a preferred embodiment, the method may be used for the synthesis of composite copper-cerium oxide nanoscale particles. The LVCC method was used to prepare composite copper-cerium oxide nanoscale particles using pressed powder targets that were prepared using 2 micron copper powder and 1 micron cerium oxide powder. Targets comprising 2, 10, 20, 40, 50 and 70 wt. % copper in cerium oxide were used. The compositions of the composite nanoscale particles described herein are defined as the composition of the target from which they are obtained. The composite copper-cerium oxide nanoscale particles were green in color and darker with increasing copper concentration. The composite copper-cerium oxide nanoscale particles comprise copper and/or copper oxide incorporated in nanoscale cerium oxide particles. XRD scans from the 2 wt. % and 20 wt. % copper targets are shown in FIGS. 2A-B, respectively. The XRD pattern obtained from 10 wt. % copper-cerium oxide nanoscale particles prepared by the LVCC method is shown in FIG. 2C.

Figure 2D:
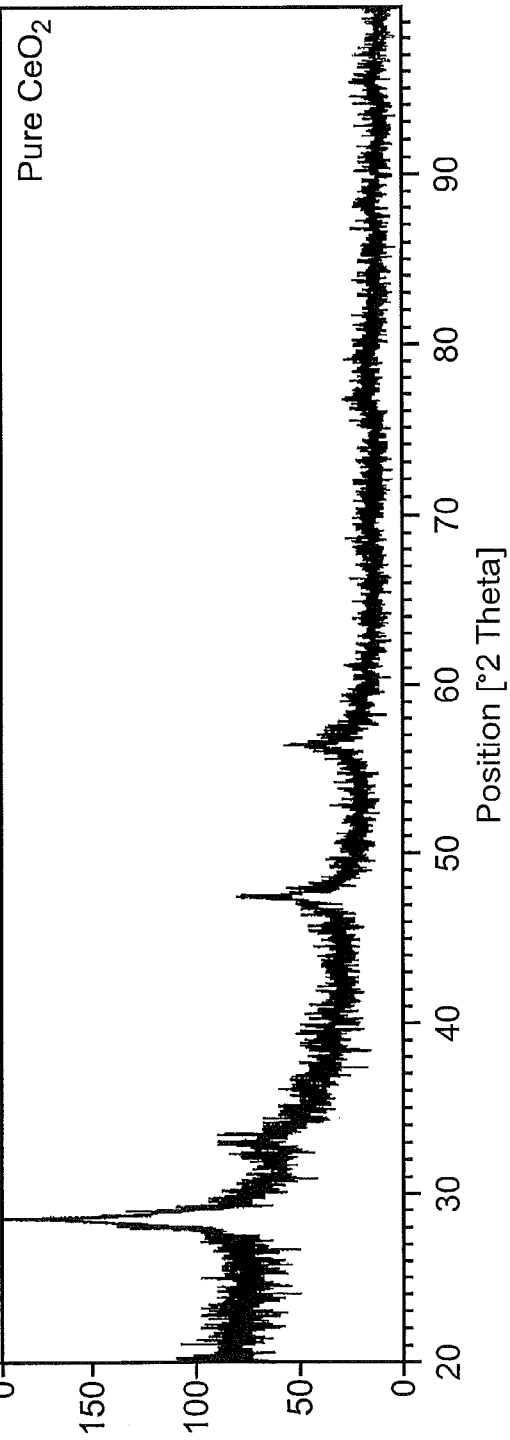

In order to compare the properties of composite copper-cerium oxide nanoscale particles with those of nanoscale metal oxide particles, pure nanoscale cerium oxide particles were prepared by laser vaporization. The nanoscale cerium oxide particles were off-white in color. FIG. 2D shows the XRD pattern obtained from cerium oxide nanoscale particles prepared by the LVCC method using a bulk cerium oxide target (99% pure $CeO_{2-x}$ pellets). The XRD data show that the cerium oxide nanoscale particles made by LVCC have the same crystal structure as the bulk $CeO_{2-x}$ pellet.

Figure 3:
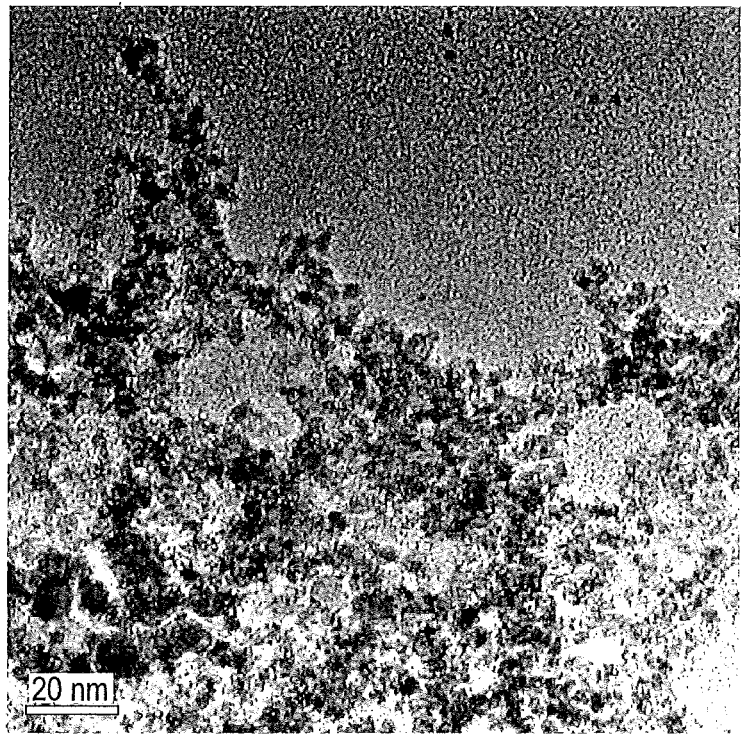
FIG. 3 shows a TEM image for composite 20:80 (wt. %) copper:cerium oxide nanoscale particles.

The size and shape of the individual composite nanoscale particles were investigated by TEM. FIG. 3 shows a TEM image of copper-cerium oxide nanoscale particles. The 20 wt. % copper-cerium oxide particles were found to be either spherical or oval in shape as evident from the TEM bright field image displayed in FIG. 3. The size distribution calculated from several TEM images indicates that the majority of the 20 wt. % copper-cerium oxide particles have an average particle size in the range of about 2-4 nm with fewer than about 5% of the particles having an average particle size in the range of about 20-50 nm.

Figure 4:
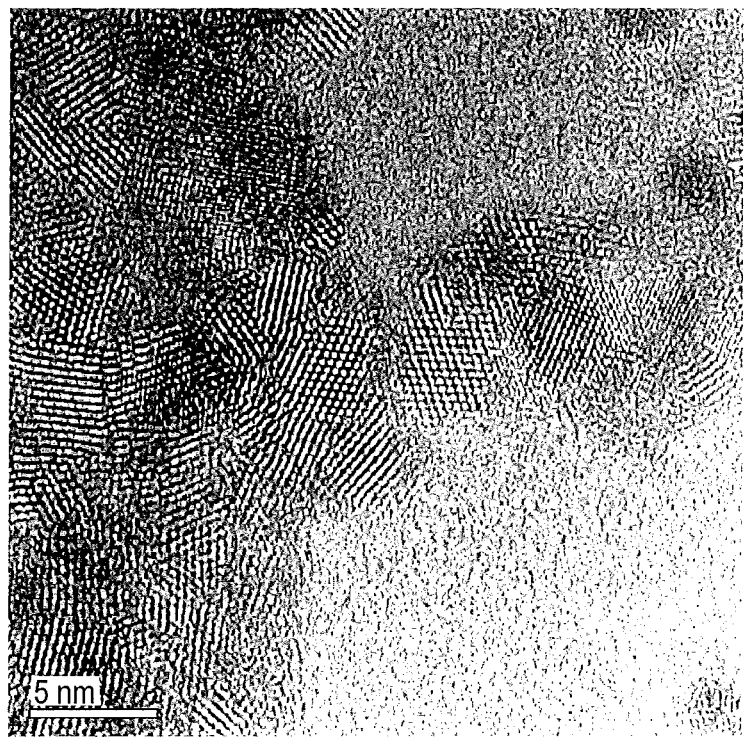
FIG. 4 shows a HRTEM image for composite 20:80 (wt. %) copper:cerium oxide nanoscale particles.
Figure 5A:
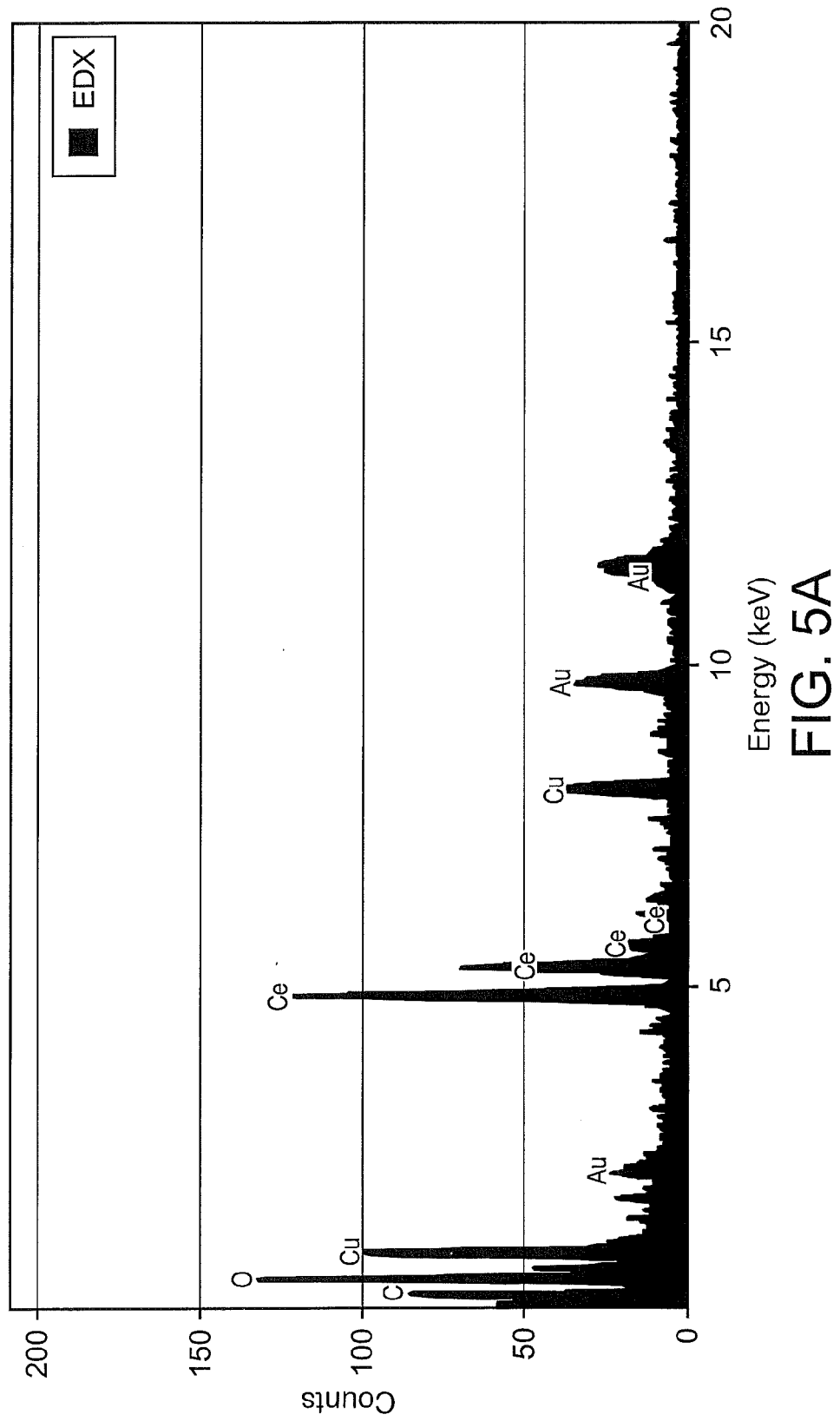
FIGS. 5A-5B show EDX spectra for composite 20:80 (wt. %) copper:cerium oxide nanoscale particles used for energy dispersive x-ray (EDX) analysis.
Figure 5B:
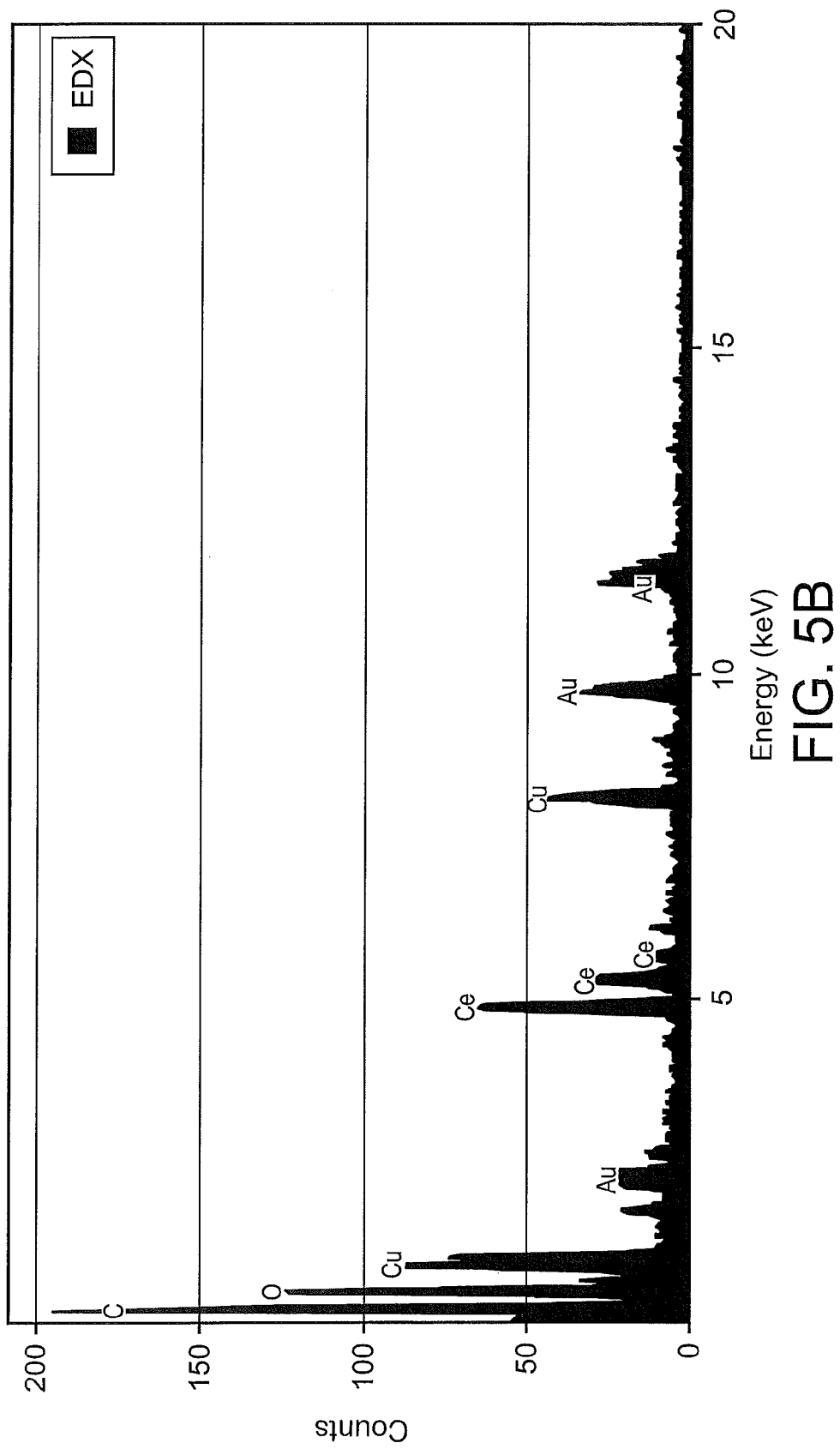
Figure 5C:
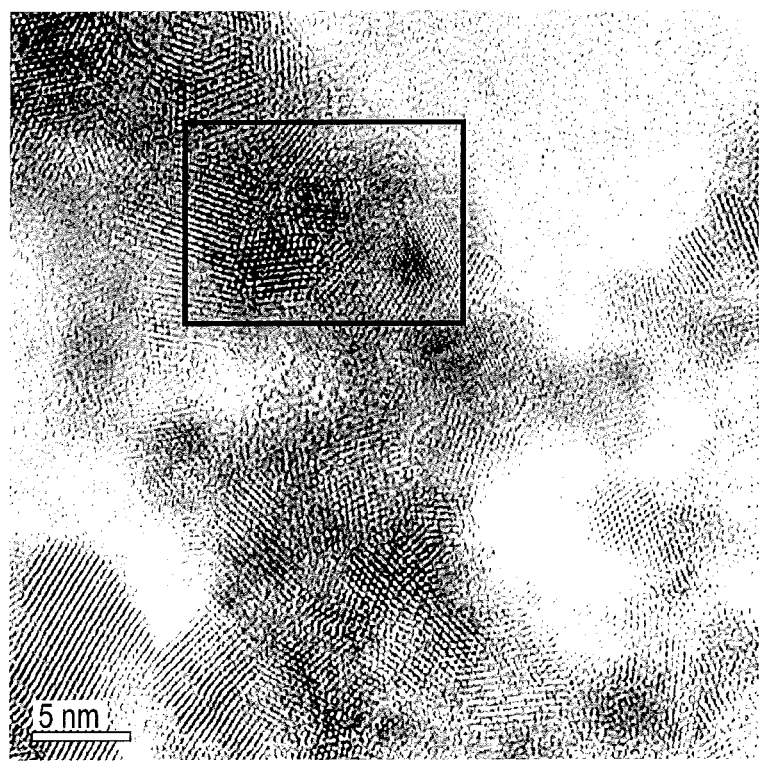
FIG. 5C shows a TEM image for composite 20:80 (wt. %) copper:cerium oxide nanoscale particles.

FIG. 4 shows a high resolution TEM image of composite copper-cerium oxide nanoscale particles. The particles have a well-defined crystal structure. An energy dispersive x-ray (EDX) spectrum of the composite nanoscale particles is shown in FIGS. 5A-B for full-field and reduced-field imaging. The TEM images corresponding to EDX scans are shown in FIG. 5C. EDX spectra from both full-field and reduced-field imaging show the presence of peaks corresponding to copper, cerium and oxygen. This indicates that copper is distributed throughout the entire sample.

High-resolution TEM of the copper-cerium oxide nanoscale particles made by laser ablation reveals a two phase structure. The first phase, which comprises 2-4 nm ceria grains (e.g., cerianite) having polygonal crystal faces, is indexed to the fluorite crystal structure. The second phase, which comprises spheres having a diameter of from about 3 to 50 nm, is indexed to the bixbyite crystal structure. According to electron energy loss spectra (EELS), the second phase comprises a reduced form of ceria (oxygen-deficient ceria) having the composition $CeO_{2-x}$ where x approaches 0.5 (e.g., x is from about 0.3 to 0.5). Energy dispersive x-ray analysis indicates that copper is incorporated throughout both ceria phases (e.g., in solid solution). In the polygonal crystals, reflections consistent with hydrated copper hydroxide (e.g., $Cu(OH)_2 \cdot H_2O$) are found. However, in only the spherical particles of ceria, copper is found in epitaxial rims of cuprite ($Cu_2O$) on the spherical particles.

Figure 6:
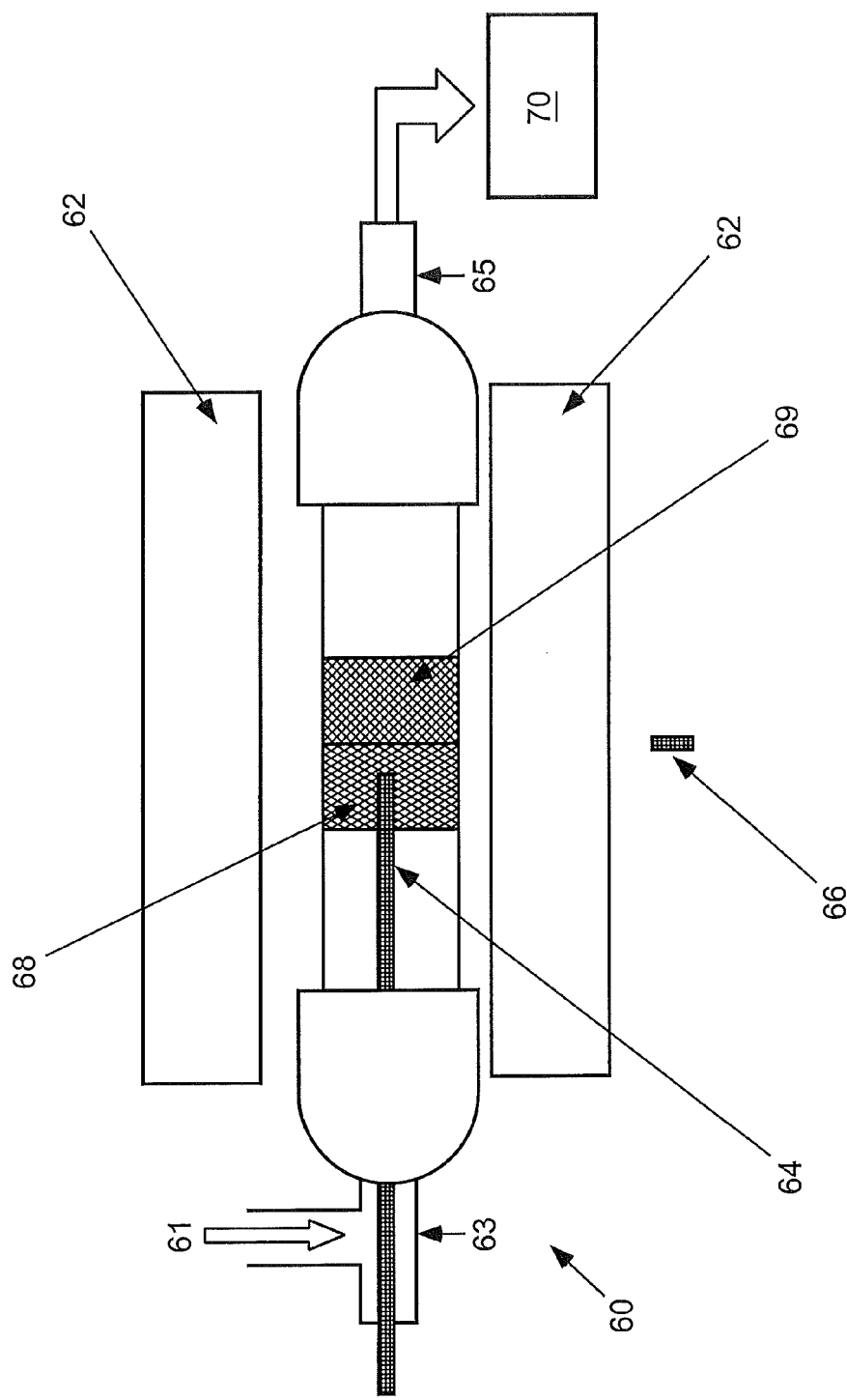
FIG. 6 shows an experimental setup for measuring the activity of composite nanoscale particles.

The activity of composite nanoscale particles was evaluated using a continuous flow packed bed reactor. An illustration of a packed bed reactor 60 positioned within a programmable tube furnace 62 is shown in FIG. 6. Thermocouples 64 and 66 are used to monitor the temperature of the furnace 62 and of the composite nanoscale particles within the reactor. To evaluate the ability of the composite nanoscale particles to reduce the concentration of carbon monoxide, about 25 mg of the composite nanoscale particles are dusted onto quartz wool 68 and placed in the middle of the reactor. A filter pad 69 can be used to prevent particulate material from entering the gas analyzer 70, which is located at a downstream side 65 of the reactor. An input reactant gas mixture 61 comprising about 4% CO and 21% $O_2$ (balance Ar) is introduced at an upstream side 63 of the reactor and is passed over the composite nanoscale particles and through the reactor at a flow rate of about 1 liter/min. After attaining a steady state flow of gas, the temperature of the furnace is increased at a heating rate of about 15° C./min. and the gas that passes over the composite nanoscale particles and emerges from the downstream side of the reactor (e.g., exhaust gas) is analyzed by a NLT2000 multi-gas analyzer 70, which measures the concentration of CO, $CO_2$ and $O_2$ in the exhaust gas.

Composite nanoscale particles having different compositions were tested in the packed bed reactor. Furthermore, in addition to testing different compositions, sequential test runs were conducted on a given composition. To conduct sequential test runs, a sample is placed in the reactor as described above and the concentration of CO, $CO_2$ and $O_2$ is measured as a function of reactor temperature until a maximum conversion of CO to $CO_2$ is observed. Then the sample is cooled to room temperature and the measurement is repeated in a subsequent heating cycle. A first heating cycle is referred to as Run A, and second and third heating cycles are referred to as Run B, Run C, etc.

Carbon monoxide conversion data for several different samples of composite nanoscale particles is shown in Table 1. The data report the temperature at which 5% of the carbon monoxide is converted to carbon dioxide ($T_5$) and the temperature at which 50% of the carbon monoxide is converted to carbon dioxide ($T_{50}$). The temperature at which 5% of the carbon monoxide is converted to carbon dioxide is referred to as the light-off temperature.

Referring to Table 1, the light off and $T_{50}$ temperatures decreased with increasing copper concentration over the range of about 2-40 wt. % copper.

TABLE 1

Summary of $T_5$ (Light-off) and $T_{50}$ Temperatures

| Sample # | Target Composition (wt. %) | Run A $T_5$ (° C.) | Run A $T_{50}$ (° C.) | Run B $T_5$ (° C.) | Run B $T_{50}$ (° C.) |
|---|---|---|---|---|---|
| 0 | $CeO_2$ (comparative) | 300 | 435 | 225 | 370 |
| 1 | 2 Cu—$CeO_2$ | 125 | 166 | 86 | 115 |
| 2 | 10 Cu—$CeO_2$ | 120 | 148 | 86 | 100 |
| 3 | 20 Cu—$CeO_2$ | 120 | 150 | 55 | 85 |
| 4 | 40 Cu—$CeO_2$ | 115 | 145 | 58 | 65 |
| 5 | 50 Cu—$CeO_2$ | 140 | 150 | 70 | 83 |
| 6 | 70 Cu—$CeO_2$ | 162 | 170 | 78 | 85 |
| 7 | 2 CuO—$CeO_2$ | 170 | 240 | 98 | 240 |
| 8 | 20 CuO—$CeO_2$ | 110 | 148 | 70 | 85 |
| 9 | 20 CuO—$CeO_2$* | 80 | 110 | 80 | 110 |
| 10 | 20 CuZn—$CeO_2$ | 154 | 173 | 80 | 95 |
| 11 | 10 Fe—$CeO_2$ | 280 | 480 | 248 | 475 |
| 12 | 10 Ag—$CeO_2$ | 160 | 180 | 75 | 122 |

The activity of the samples reported in Table 1 is for composite nanoscale particles in the as-deposited condition, except sample 9 (marked with as asterisk,*), which was heated at 300° C. for 45 min. in 20% $O_2$-Argon following deposition and before introduction to the reactor (i.e., before Run A). The heating of the composite nanoscale particles prior to incorporating the composite nanoscale particles in and/or on the at least one of tobacco cut filler, cigarette paper and cigarette filter material can be used to enhance the catalytic activity of the composite nanoscale particles.

Figure 7A:
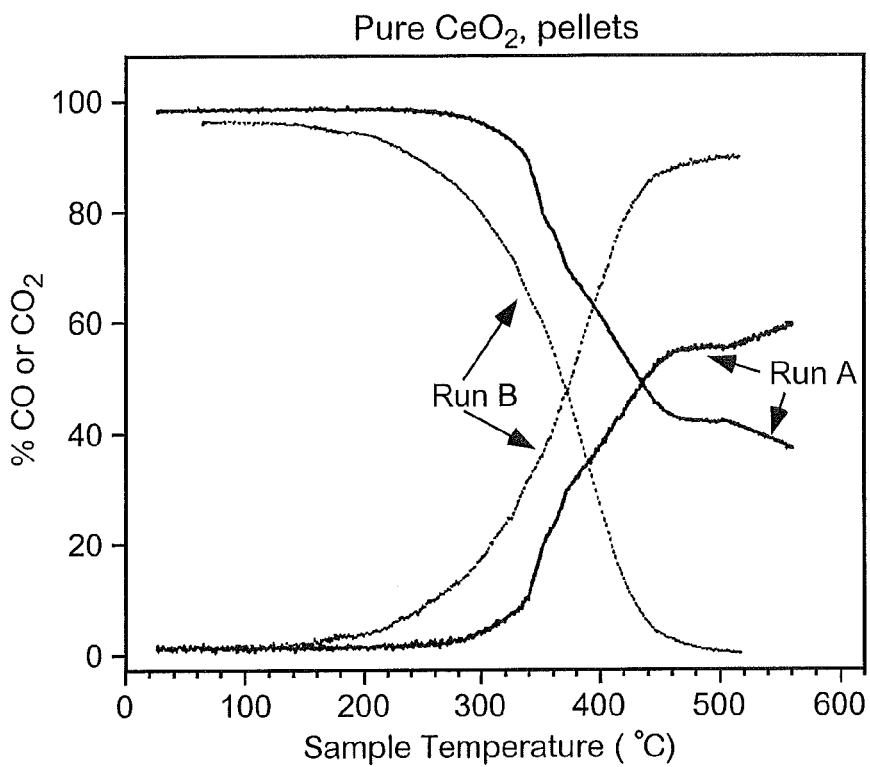
FIGS. 7A-7L show the percent conversion of CO to $CO_2$ versus sample temperature for composite copper:cerium oxide nanoscale particles having different amounts of copper.
Figure 7B:
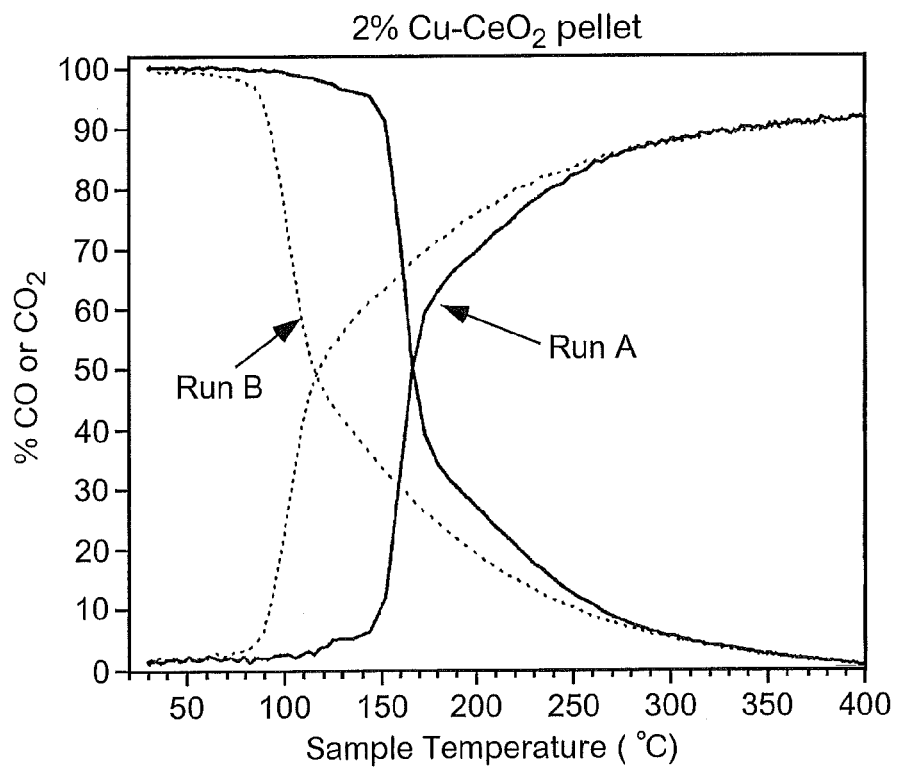
Figure 7C:
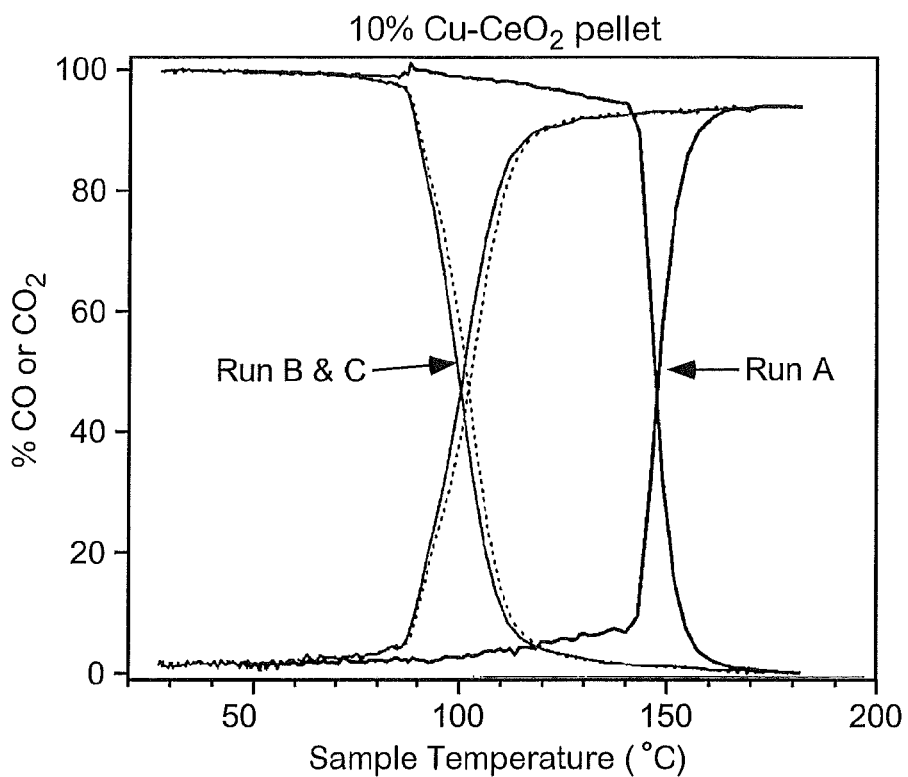
Figure 7D:
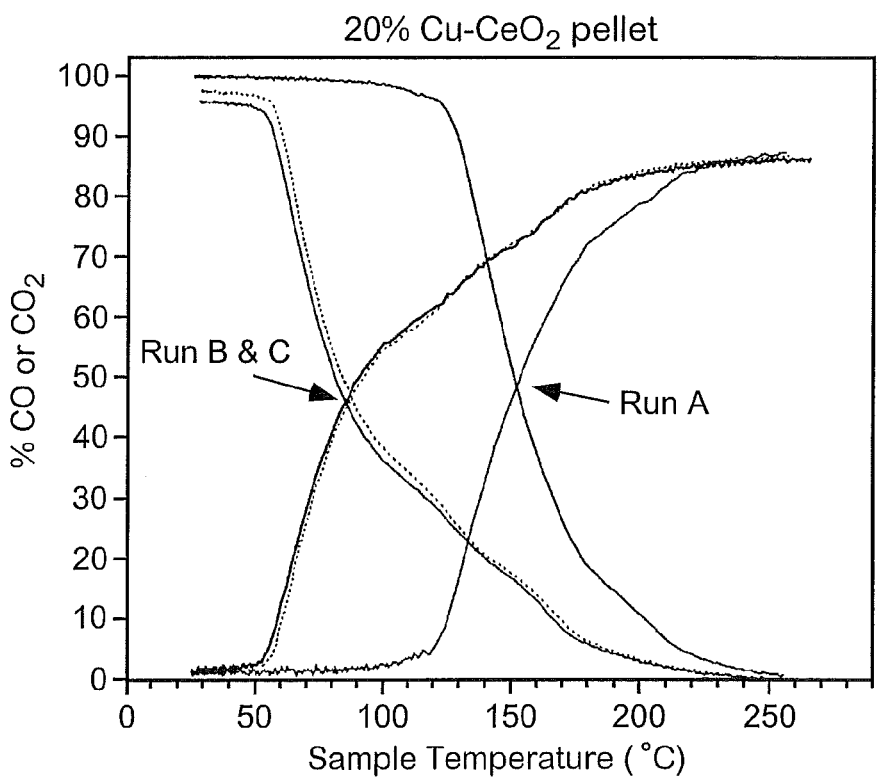
Figure 7E:
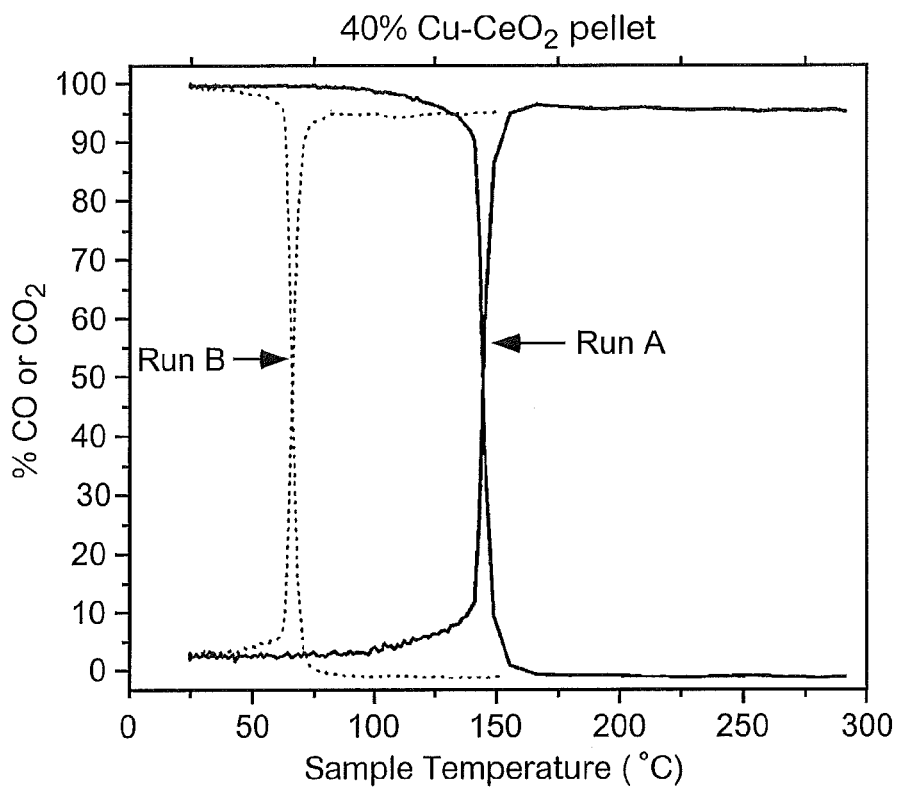
Figure 7F:
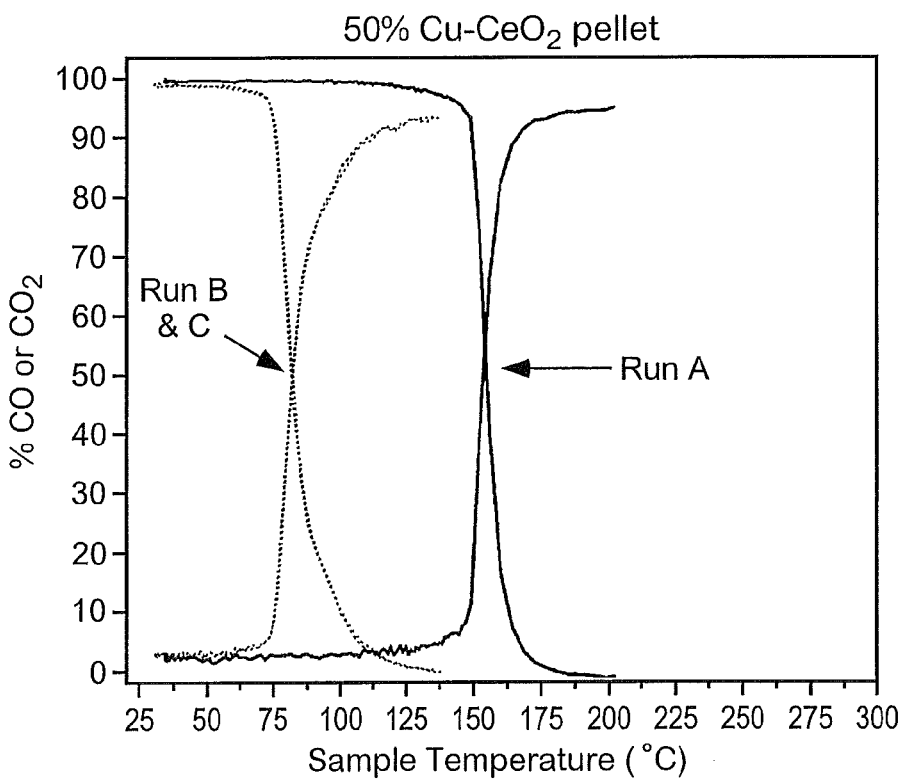
Figure 7G:
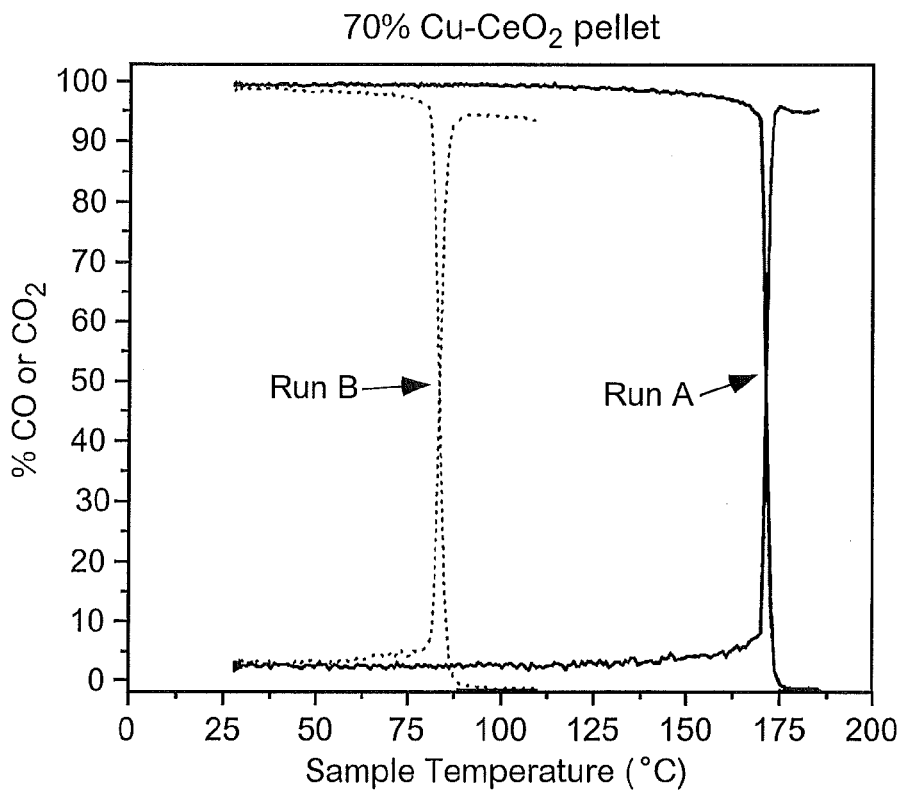
Figure 7H:
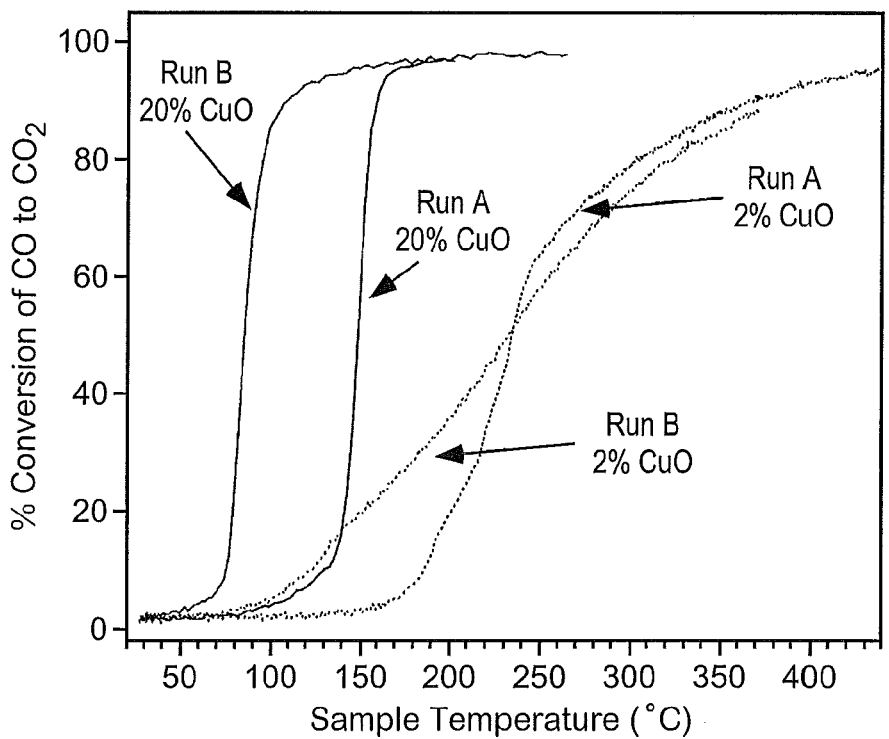
Figure 7I:
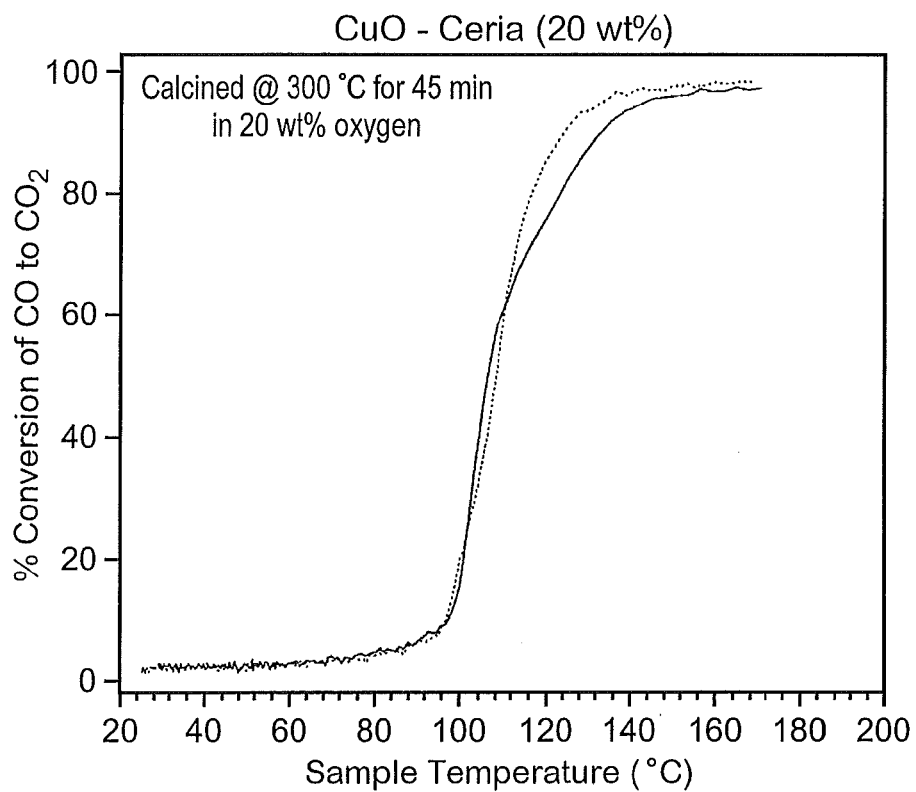
Figure 7J:
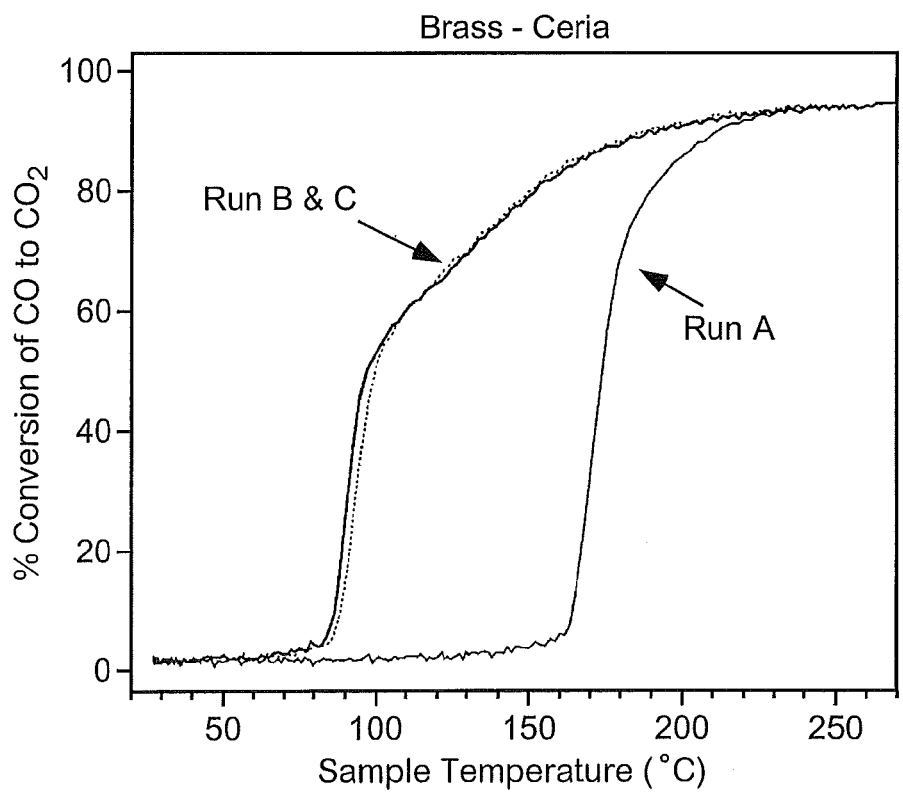
Figure 7K:
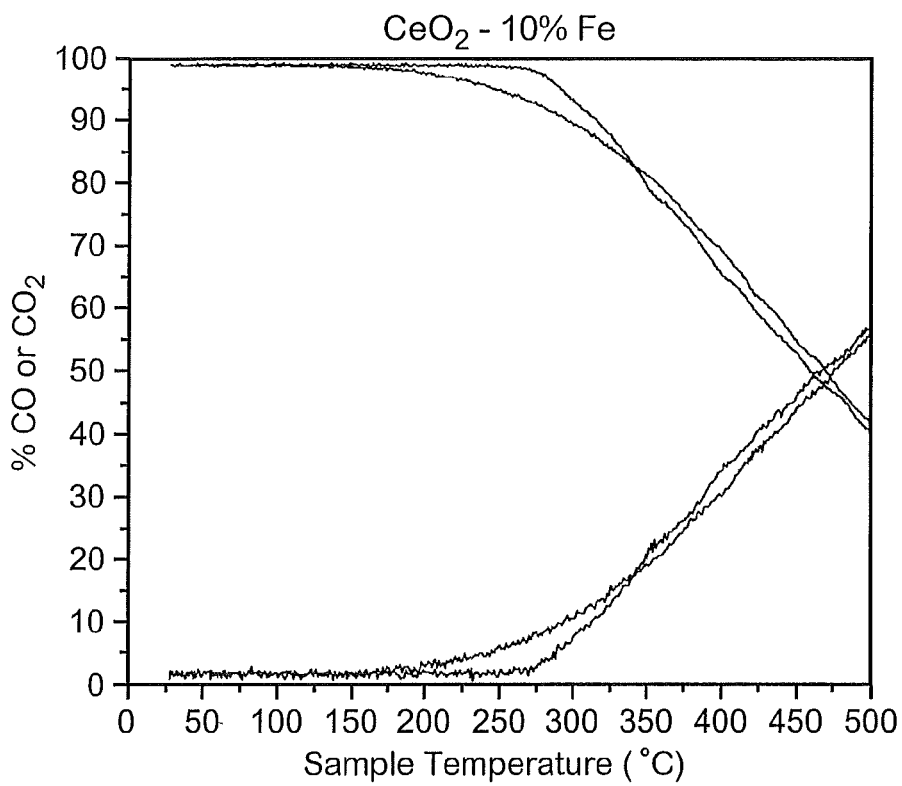
Figure 7L:
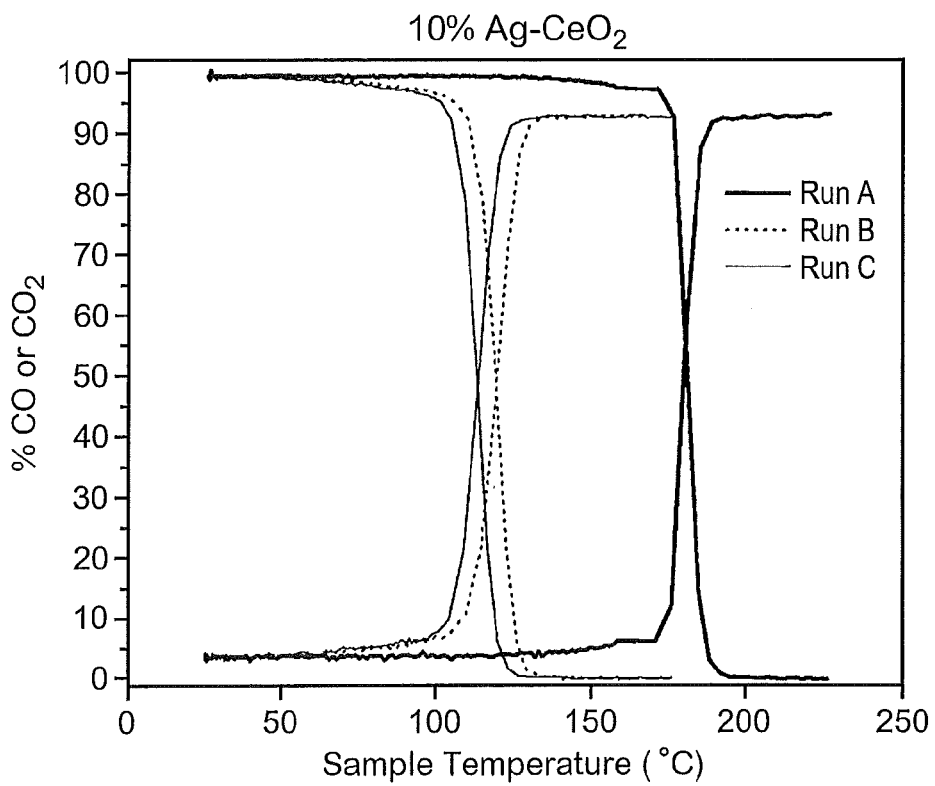

FIGS. 7A-7G show the percent CO or $CO_2$ versus sample temperature for samples 0-6, respectively. The CO to $CO_2$ conversion data for samples 7 and 8 are shown in FIG. 7H, and the data for samples 9-12 are shown in FIGS. 7I-7L, respectively.

Long term catalytic activity was measured using a sample comprising about 25 mg of the 50 wt. % copper-cerium oxide nanoscale particles dusted onto quartz wool and positioned in the reactor as described above. After initiation of catalytic activity at about 150° C. (Run A), the furnace temperature was maintained at about 80° C. (Run B). Complete conversion of carbon monoxide to carbon dioxide for an input reactant gas mixture comprising about 4% CO, 21% $O_2$, balance Ar was observed for a period of 10 hrs. Using the same gas mixture, greater than 90% conversion of carbon monoxide to carbon dioxide was observed for 25 mg of 20 wt. % copper-cerium oxide nanoscale particles heated first to 200° C. (Run A) and then maintained at 65° C. (Run B) for 5 hours.

The activity of composite copper-cerium oxide nanoscale particles (25 mg samples) was evaluated for tobacco smoke using the packed bed reactor described above. In place of the 4% CO, 21% $O_2$ (balance Ar) input gas, the smoke from a standard cigarette that was smoked using a conventional cigarette smoking apparatus (about 35 ml puffs at a frequency of 1 puff/min.) was first filtered to remove particulate matter and then entrained in nitrogen carrier gas (2 liters/min.) and passed over the heated composite nanoscale particles. As above, the particles were heated in the reactor to different temperatures (e.g., 120° C., 250° C., 400° C.). The concentrations of CO and $CO_2$ in the exhaust were measured for the several different temperatures.

In order to establish a baseline for comparison, the concentrations of CO and $CO_2$ in the cigarette exhaust gas were measured in the absence of composite nanoscale particles. The baseline ratio (no composite nanoscale particles present) of $CO/CO_2$ exhausted from a reactor heated to 400° C. was 0.48.

With a 25 mg sample of 2 wt. % copper-cerium oxide nanoscale particles loaded in the reactor, the $CO/CO_2$ ratio was 0.45, 0.3 and 0.1 for reactor temperatures of 120° C., 250° C. and 400° C., respectively. That is, the 2 wt. % copper-cerium oxide nanoscale particles achieved 38% and 80% reduction in the carbon monoxide concentration at 250° C. and 400° C., respectively.

With a 25 mg sample of 20 wt. % copper-cerium oxide nanoscale particles loaded in the reactor, the $CO/CO_2$ ratio was 0.34 and 0.16 for reactor temperatures of 250° C. and 400° C., respectively. That is, the 20 wt. % copper-cerium oxide nanoscale particles achieved 30% and 67% reduction in the carbon monoxide concentration at 250° C. and 400° C., respectively.

Figure 8:
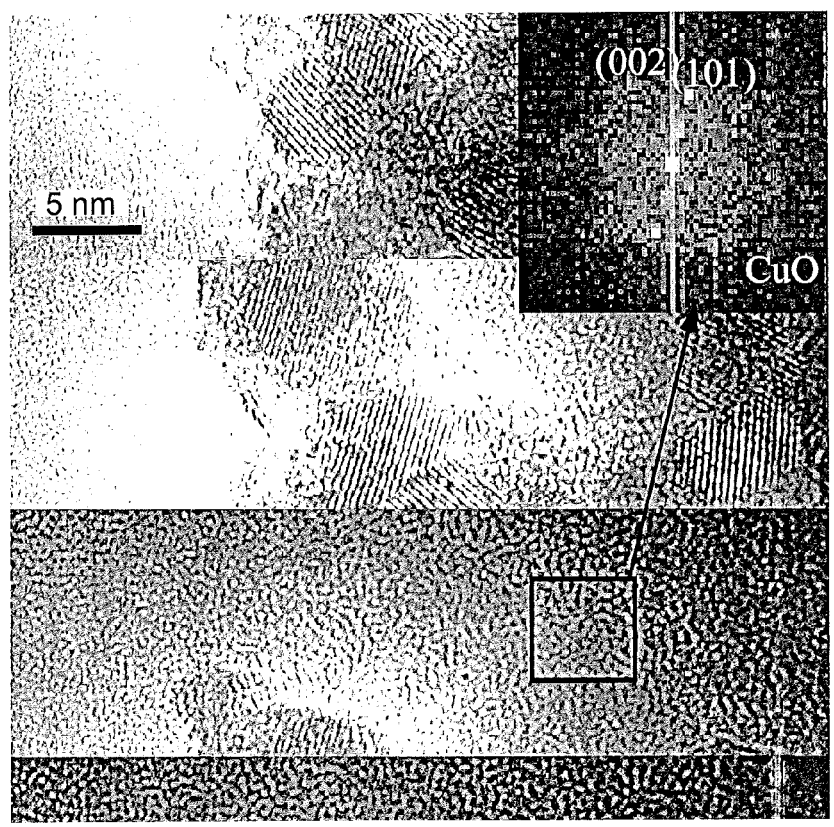
FIG. 8 shows a TEM and electron diffraction image for a 50:50 (wt. %) copper:cerium oxide sample after heating the sample to about 200° C.

FIG. 8 shows a TEM micrograph and electron diffraction pattern (inset) for composite 50 wt. % copper-cerium oxide nanoscale particles. The composite nanoscale particles shown in FIG. 8 correspond to Sample 5 in Table 1 after the completion of Run A (i.e., after heating the sample at about 200° C. in a gas mixture comprising about 4% CO and 21% $O_2$ and balance Ar). After activation (i.e., upon initial heating), nanoscale particles of copper oxide (CuO) were formed within the matrix of cerium oxide. The crystal structure and grain size of the cerium oxide are substantially unchanged by the activation.

Figure 9:
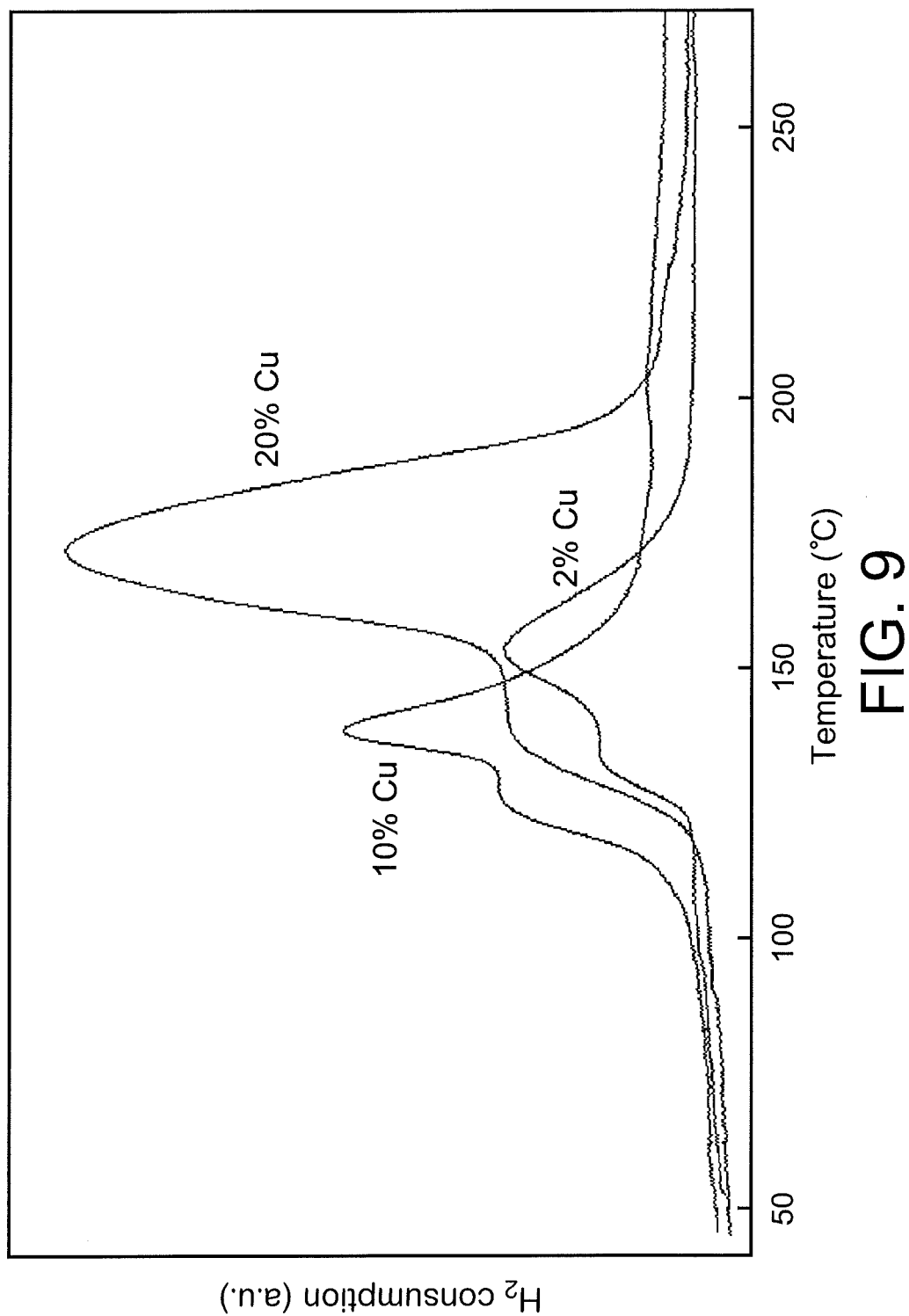
FIG. 9 shows Temperature Programmed Reduction (TPR) data for composite copper-cerium oxide nanoscale particles.

Temperature Programmed Reduction (TPR) was used to investigate the reduction behavior of the composite copper-cerium oxide nanoscale particles. Samples were heated in a 7% $H_2$—Ar gas mixture and $H_2$ consumption was measured as a function of temperature. FIG. 9 shows the TPR curves for three different compositions of copper. Each of the three samples display two reduction peaks of $H_2$ consumption, which suggests that at least two different copper species are present in the samples.

The composite nanoscale catalysts may be used in a variety of applications. For example, the catalyst may be incorporated into a hydrocarbon conversion reactor in an amount effective to convert hydrocarbons. The catalyst may be incorporated into a vehicle exhaust emissions system in an amount effective to oxidize carbon monoxide to carbon dioxide. The catalyst may also be used for emissions reduction in the cold starting of an automobile engine in an amount effective to oxidize carbon monoxide to carbon dioxide. In another embodiment, the catalyst may be incorporated into a laser in an amount effective to oxidize carbon monoxide to carbon dioxide. In another embodiment, the catalyst can be incorporated into a fuel cell in an amount effective to oxidize carbon monoxide to carbon dioxide. In yet another embodiment, the catalyst can be used in an air filter for the conversion of carbon monoxide and/or indoor volatile organic compounds.

While various embodiments have been described, it is to be understood that variations and modifications may be resorted to as will be apparent to those skilled in the art. Such variations and modifications are to be considered within the purview and scope of the claims appended hereto.

All of the above-mentioned references are herein incorporated by reference in their entirety to the same extent as if each individual reference was specifically and individually indicated to be incorporated herein by reference in its entirety.

What is claimed is:

1. A method of making composite nanoscale particles comprising: subjecting a starting material to laser energy so as to form a vapor and condensing the vapor so as to form the composite nanoscale particles, wherein said composite nanoscale particles comprise a first metal and/or a first metal oxide incorporated in nanoscale particles of an oxide of a second metal, the first metal being different than the second metal, wherein the second metal is selected from the group consisting of Mg, Cr, Mn, Cu, Zn, Ge, Y, Zr, Nb, Ru, Rh, Pd, Ag, Sn, Ce, Pr, La, Hf, Ta, W, Re, Os, Ir and Au, and wherein the starting material comprises the first metal oxide and/or the second metal oxide.

2. The method according to claim 1, wherein at least some of the first metal and/or the first metal oxide is incorporated in the lattice structure of the oxide of the second metal.

3. The method according to claim 1, wherein the starting material comprises the first and second metals or compounds of the first and second metals in the form of one or more targets.

4. The method according to claim 1, wherein the starting material comprises a single target of the first metal and oxide of the second metal.

5. The method according to claim 1, wherein the starting material comprises a first target of the first metal and/or first metal oxide and a second target of the second metal and/or oxide of the second metal.

6. The method according to claim 1, wherein the composite nanoscale particles comprise from about 2 to 70% by weight of the first metal and/or the first metal oxide.

7. The method according to claim 1, wherein the first metal is selected from the group consisting of Mg, Al, Si, Ti, V, Cr, Mn, Fe, Co, Ni, Cu, Zn, Ge, Y, Zr, Nb, Mo, Ru, Rh, Pd, Ag, Sn, Ce, Pr, La, Hf, Ta, W, Re, Os, Ir, Pt and Au.

8. The method according to claim 1, wherein the first metal consists of copper and the oxide of the second metal consists of cerium oxide.

9. The method according to claim 1, wherein the oxide of the second metal is at least partially a non-stoichiometric oxide of the second metal.

10. The method according to claim 1, wherein the composite nanoscale particles have an average particle size of less than about 100 nm.

11. The method according to claim 1, wherein vaporization by the laser is provided by the second harmonic of a Nd YAG laser at 532 nm with 15-100 mJ/pulse.

12. The method according to claim 1, wherein the vaporization and condensing are carried out in a reaction chamber.

13. The method according to claim 12, wherein the reaction chamber has an upper portion and a lower portion and wherein the temperature maintained in the upper portion is less than the temperature maintained in the lower portion such that the condensing occurs in the upper portion.

14. The method according to claim 12, further comprising adding an inert carrier gas or a reactive gas mixture comprising an inert carrier gas and a reactive gas to the reaction chamber.

15. The method according to claim 14, wherein the inert carrier gas is helium or argon gas.

16. The method according to claim 14, wherein the reactive gas mixture comprises an inert carrier gas and oxygen.

17. The method according to claim 1, wherein a beam of the laser strikes the starting material such that the beam is moved relative to the starting material.

18. The method according to claim 1, wherein the vapor is formed in a reaction chamber maintained at a pressure greater than about 103 Torr.

19. The method according to claim 1, wherein the vapor is formed in a reaction chamber maintained at a pressure of between about 760 to 104 Torr.

20. The method according to claim 1, wherein the vapor is formed in a reaction chamber maintained at about atmospheric pressure.

21. The method according to claim 1, wherein the condensing is achieved by maintaining a temperature gradient in a reaction chamber, the starting material being vaporized in the reaction chamber and the vapor condensing to form the composite nanoscale particles.

22. The method of claim 1, wherein the first metal and the oxide of the second metal condense in the gas phase to form the composite nanoscale particles.

23. The method according to claim 1, wherein the vapor is formed in a reaction chamber containing a reactant gas selected from oxygen, water vapor, air or mixtures thereof.

24. The method according to claim 1, further comprising heating the composite nanoscale particles at a temperature of at least about 200° C.

25. The method according to claim 24, wherein the composite nanoscale particles are heated in an atmosphere comprising oxygen which oxidizes the first metal.

26. The method according to claim 24, wherein the composite nanoscale particles are heated in an atmosphere comprising argon and about 20% oxygen which oxidizes the first metal.

27. The method according to claim 1, wherein the second metal is selected from the group consisting of Mg, Cr, Mn, Ge, Y, Zr, Nb, Ru, Rh, Pd, Ag, Sn, Ce, Pr, La, Hf, Ta, W, Re, Os, Ir and Au.

28. The method according to claim 1, wherein the composite nanoscale particles comprise a first metal incorporated in nanoscale particles of an oxide of a second metal.

29. The method according to claim 1, wherein the composite nanoscale particles comprise from about 10 to 70% by weight of the first metal and/or the first metal oxide.

30. The method according to claim 8, wherein the composite nanoscale particles comprise two crystalline phases consisting of a fluorite crystal structure and a bixbyite crystal structure.

* * * * *